[12] United States Patent
Rohrbaugh et al.

(10) Patent No.: US 7,066,998 B2
(45) Date of Patent: Jun. 27, 2006

(54) COATINGS FOR MODIFYING HARD SURFACES AND PROCESSES FOR APPLYING THE SAME

(75) Inventors: Robert Henry Rohrbaugh, Hamilton, OH (US); Michael Ray McDonald, Middletown, OH (US); John David Carter, Mason, OH (US); Eugene Paul Gosselink, Cincinnati, OH (US); Chanchal Kumar Ghosh, West Chester, OH (US); Helen Frances O'Connor, Loveland, OH (US); Heather Anne Liddle, Cincinnati, OH (US); Marc Francois Evers, Strombeek-Bever (BE); Morgan Thomas Leahy, Cincinnati, OH (US); Alan Scott Goldstein, Blue Ash, OH (US); Brian Joseph Loughnane, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 530 days.

(21) Appl. No.: 10/020,064

(22) Filed: Dec. 13, 2001

(65) Prior Publication Data

US 2002/0176982 A1 Nov. 28, 2002

Related U.S. Application Data

(63) Continuation-in-part of application No. 09/828,014, filed on Apr. 6, 2001, now abandoned, and a continuation-in-part of application No. 09/876,363, filed on Jun. 7, 2001, now abandoned, and a continuation-in-part of application No. 09/950,757, filed on Sep. 11, 2001, now Pat. No. 6,846,512, which is a continuation-in-part of application No. 09/875,311, filed as application No. PCT/US00/16349 on Jun. 14, 2000, now abandoned, and a continuation-in-part of application No. 09/972,090, filed on Oct. 5, 2001, now Pat. No. 6,562,142.

(60) Provisional application No. 60/265,059, filed on Jan. 30, 2001.

(51) Int. Cl.
C09K 3/00 (2006.01)
C09D 1/00 (2006.01)
C09C 1/42 (2006.01)
C09C 3/00 (2006.01)

(52) U.S. Cl. .................. 106/286.5; 106/286.2; 106/286.8; 106/287.17; 106/287.35; 106/400; 106/468; 106/316

(58) Field of Classification Search .............. 106/286.2, 106/286.5, 286.8, 287.17, 287.35, 316, 400, 106/468
See application file for complete search history.

(56) References Cited

U.S. PATENT DOCUMENTS 4,247,339 A * 1/1981 Bolton et al. ................ 106/468
5,989,696 A * 11/1999 McCarthy et al. .......... 427/356
6,562,142 B1 * 5/2003 Barger et al. ................... 134/6

FOREIGN PATENT DOCUMENTS

EP 0732218 A1 * 9/1996

OTHER PUBLICATIONS

The American Heritage Dictionary of the English Language, Fourth Edition. 2000, Houghton–Mifflin Company, wetting agent.*
Lee et al, Influence of Pigment Particles on Gloss and Printability for Inkjet Paper Coatings, Western Michigan University, Kalamazoo, MI.*
"Ultraviolet Cure–in–Place Technology", (PCI), Paint and Coatings Industry, Feb. 21, 2004.*

* cited by examiner

Primary Examiner—David Brunsman
(74) Attorney, Agent, or Firm—Laura R. Grunzinger; Kim William Zerby; Steven W. Miller

(57) ABSTRACT

Materials for coating, coating compositions, methods and articles of manufacture comprising a nanoparticle system or employing the same to impart surface modifying benefits for all types of hard surfaces are disclosed. In some embodiments, dispersement of nanoparticles in a suitable carrier medium allows for the creation of coating compositions, methods and articles of manufacture that create multi-use benefits to modified hard surfaces. In some embodiments, actively curing the coating composition on the hard surfaces, including, but not limited to by radiative heating the air surrounding the hard surface with the coating thereon can be used to increase the durability of the hard surface coating.

14 Claims, 6 Drawing Sheets

COATINGS FOR MODIFYING HARD SURFACES AND PROCESSES FOR APPLYING THE SAME

CROSS-REFERENCE TO RELATED APPLICATIONS

This application claims the benefit of the filing dates of PCT application Ser. No. US00/16349, filed Jun. 14, 2000, and U.S. Provisional patent application Ser. No. 60/265,059, filed Jan. 30, 2001.

FIELD OF THE INVENTION

The present invention relates to coatings, compositions, methods and articles of manufacture comprising a nanoparticle system or employing the same to impart surface modifying benefits for all types of inanimate hard surface applications.

The use of non-photoactive nanoparticles allows for the creation of coatings, compositions, methods and articles of manufacture that create multi-use benefits to modified hard surfaces. These surface modifications can produce durable, long lasting or semi-permanent multi-use benefits that include at least one of the following improved surface properties: wetting and sheeting, quick drying, uniform drying, soil removal, self-cleaning, anti-spotting, anti-soil deposition, cleaner appearance, enhanced gloss, enhanced color, minor surface defect repair, smoothness, anti-hazing, modification of surface friction, release of actives, and transparency (e.g. in the case of glass and the like), relative to hard surface unmodified with such nanoparticle systems.

BACKGROUND OF THE INVENTION

There have been many problems associated with developing hard surface coatings that provide a beneficial layer with the desirable properties and which minimize the disadvantages, such as a limit to single use protection, insufficient coverage, roughness and/or flaking of coating during use, or in contrast, the inability to remove once applied (when a more temporary coating is desired), a limit on surfaces that can be modified, photoactive damage and degradation of the surface, and in the case of $TiO_2$, the need to photoactivate the coating.

Current approaches to solving the coating problem use surfactants, film-forming polymer coatings, clay-containing-film-forming polymer coatings and photoactive inorganic metal oxide coatings. However, the substantivity of the film-forming polymers (e.g. alkoxylated silicones, poly(N-vinyl-2-pyrrolidones, poly(N-vinyl-imidazoles, diblock copolymers of poly(ethylene oxide) and poly (lactide)) is poor such that its wetting/sheeting effect is short-lived, with spotting/residue negatives returning within 1–2 rinses, exposures to the elements (e.g., rain, etc.), or conditions (e.g., water in a shower). Elevating the levels of polymers is not the solution to this problem. This is especially evident on automobile surfaces, residential windows, building exteriors, shower units and dishware where elevated levels of polymers result in unacceptable residue problem. In the case of clay-containing, film-forming polymer coatings, the nanoparticles are rheology agents for the formulations and do not themselves impart the benefit disclosed.

Additional background patents and patent publications, some of which disclose various uses of nanoparticles, include: U.S. Pat. Nos. 4,591,499 and 4,597,886; JP 04-353438; U.S. Pat. No. 5,429,867; JP 96053558; GB 2 303 373; U.S. Pat. No. 5,853,809; PCT WO 99/00457; WO 00/000554 A1; WO 01/27236; and WO 01/32820.

SUMMARY OF THE INVENTION

The present invention relates to materials, coatings, compositions, methods, and articles of manufacture that provide benefits to hard surfaces that can be made durable, long lasting or semi-permanent. These benefits may include at least one of the following: improved surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion, and improved transparency (the latter in the case of surfaces such as glass and the like, particularly after such surfaces are soiled or contacted with water) relative to transparent surfaces that are not treated with the materials, coatings, or coating composition, and anti-fogging in the case of surfaces (such as mirrors) that are designed to reflect. The following are some non-limiting embodiments of the present invention.

In one embodiment of the present invention there is provided a material for coating a hard surface. As used herein, the term "coating" includes coatings that completely cover a surface, or portion thereof, as well as coatings that may only partially cover a surface, such as those coatings that after drying leave gaps in coverage on a surface. The later category of coatings may include, but is not limited to a network of covered and uncovered portions (e.g., non-continuous covered regions of the surface). When the coatings described herein are described as being applied to a surface, it is understood that the coatings need not be applied to, or that they cover the entire surface. For instance, the coatings will be considered as being applied to a surface even if they are only applied to modify a portion of the surface.

The material for coating a hard surface can comprise a plurality of non-photoactive nanoparticles, or it can comprise a hard surface coating composition. Such a coating composition may comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally one or more adjunct ingredients; and (e) optionally a suitable carrier medium.

In other embodiments of the present invention, there is provided a method of applying a substantially clear coating to a hard surface comprising: applying a material comprising an effective amount of non-photoactive nanoparticles to the hard surface; and, actively curing the material to form a coating on the hard surface.

In other embodiments of the present invention there is provided a method of using a coating composition by (a) mixing said nanoparticles in suitable carrier medium to form said coating composition; (b) optionally mixing said nanoparticles dispersed in suitable carrier medium with adjunct ingredients to form said coating composition; (c) optionally mixing said nanoparticles dispersed in suitable carrier medium with surfactant to form said coating composition; (d) optionally mixing said nanoparticles dispersed in suitable carrier medium with adjunct ingredients and surfactant to form said coating composition; (e) applying the coating composition to a hard surface; (f) allowing the coating composition to dry, or drying the coating composition; and (g) optionally repeating any of steps (a) through (f) as needed.

The drying step can comprise air-drying in ambient conditions, or it can comprise actively drying the coating composition by utilizing any technology known for accelerating the drying process. It has been found the heat drying the hard surface coating composition can greatly increase the durability of the hard surface coating.

In other embodiment of the present invention there is provided an article of manufacture (or a kit) comprising an applicator, such as a spray dispenser, an immersion container, a hose spray dispenser attachment, a fabric or a porous article, such as a sponge; further comprising (a) a coating composition, wherein said coating composition is in the physical form selected from the group consisting of liquid, liquid concentrate, gel, powder, tablet, granule and mixtures thereof; (b) optionally a source of water or deionized water; and (c) optionally a set of instructions in association with said spray dispenser comprising an instruction to dispense said coating composition from said spray dispenser onto said hard surface.

In other embodiments of the present invention there is provided a treated hard surface coated with the coating composition. Substrates treated with the benefit agent materials of the present invention may, in certain cases, exhibit a greater improvement in wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency than substrates treated without such benefit agent materials.

In other embodiments of the invention there is provided a treated hard surface coated with a coating composition, where the coating composition is strippable. Substrates treated with the benefit agent materials of the present invention may exhibit a greater improvement in soil removal, self-cleaning, anti-spotting, anti-soil deposition, cleaner appearance after at least one effective nanoparticle layer has been stripped than substrates treated without such benefit agent materials.

Numerous other embodiments are also possible. These elements of the embodiments described herein can also be combined in other ways, or with other elements to create still further embodiments.

All percentages, ratios and proportions herein are on a weight basis based on a neat product unless otherwise indicated. All documents cited herein are hereby incorporated by reference.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

Hard Surfaces

Figure 1:
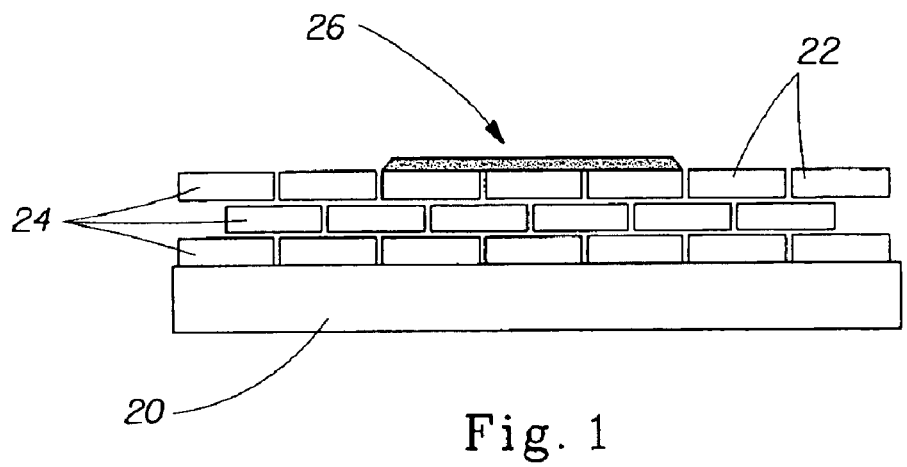
FIG. 1 is a schematic side view of a hard surface with several layers of nanoparticles that form a coating thereon, and soil on a portion of the nanoparticle coating.

The coating described herein can be applied to many types of hard surfaces, including, but not limited to fiberglass, plastics, metals, glass, dishware, ceramic, porcelain, wood, and stone. Fiberglass surfaces comprise resins, polymers, reinforcing fabric and fibers. Hard surfaces made from fiberglass include but are not limited to bathtubs, boats, motorcycles, car bodies, canoes, airplanes, model aircraft, jet skis, sculptures, as well as traditional industrial molding and model-making articles.

There are seven basic types of hard surface plastics which include polyethylene terephthalate (PET), high density polyethylene (HDPE), polyvinyl chloride (PVC), low density polyethylene (LDPE), polypropylene (PP), polystyrene (PS), polymers and mixtures thereof. These types of plastics may also be combined with other materials including, but not limited to nanoparticles, to make all sorts of composites. Carbon and graphite fibers are high-strength materials that are used as reinforcing agents in plastic composites. Examples of plastic articles include bottles, jars, jugs, bags, covers, pipes, furniture, containers, caps, cups, trays, aircraft fuselages and wings, spacecraft structures, and sports equipment.

Both ferrous and nonferrous metal surfaces are available for use with this invention. These include aluminum, brass, bronze, chrome, copper, tin, zinc, iron, stainless steel and steel. Examples of metal surfaces include (e.g. buildings, doors, window frames, automobiles, boats, structures, and many more too numerous to mention).

There are three basic types of glass-sheet, plate, and float. These basic glass types can be changed to meet modern requirements for comfort, security, safety, and architectural needs by adding chemicals or other ingredients during fabrication and processing.

There are a number of distinct dishware surface types available. Dishware can include glassware, ceramic ware, plastic ware, wood ware and metal ware. Examples of dishware include agateware, basalt, bisque, bone china, cauliflower ware, cream ware, delft, earthenware, flambe, hard paste porcelain, ironstone, jackfield, jasper, lusterware, majolica, marbled, parian, pate-sur-pate, pearl ware, porcelain, redware, salt glaze, slipware, snowman-porcelain, soft paste porcelain, spatter ware, staffordshire figures, stoneware, tortoiseshell, and transfer ware. Utensils can also be made from any of the above materials.

Ceramic surfaces include glazed tile, mosaic tile, and quarry tile. Applications of ceramic tiles include countertops, walls, floors, ceilings and appliances. Other types of articles, such as sinks, bath tubs, and toilets may be made of porcelain, ceramic, or other materials.

There are many types of wood surfaces available. Articles made from wood can include, but are not limited to: furniture, baseball bats, chairs, stools, furniture, handles, motor-vehicle parts, barrels and crates, sporting and athletic goods, railroad ties, veneer, flooring, treated lumber, such as that used for decks, siding, crates, and interior finishing.

There are three basic types of stone surfaces available—igneous, metamorphic and sedimentary. Some of these surfaces include granite, marble, slate, sandstone, serpentinite, schistose gneiss, quartzite, sandstone, limestone and fieldstone. Stone is often used in construction of buildings, roads, walls, fireplaces and monuments. There are a number of types of concrete surfaces available as well. Finally coated and painted surfaces are also examples of hard surfaces that can be modified by the present invention to derive the desired benefits.

In certain aspects, the hard surfaces described herein are preferably rigid (not flexible). Examples of surfaces that are not considered to be rigid would include films. In certain aspects, the surfaces described herein are more rigid than a synthetic resin film having a thickness of 0.1 mm.

In certain aspects, it is desirable for the coating compositions to be applied to exposed surfaces. As used herein, the term "exposed surfaces" includes exterior surfaces that are exposed to the elements. In certain aspects, the coating compositions are applied to interior surfaces that are subject to periodic contact with water (including, but not limited to the bathroom surfaces described above). Interior surfaces that are subject to periodic active contact with water may be distinguished from interior surfaces on which water or condensation merely passively accumulates, based on the fact that the former may have water showered, rinsed, or splashed thereon.

In certain aspects, the hard surfaces described herein need not be transparent. That is, the surfaces may be translucent or opaque.

Nanoparticle System

The nanoparticle system comprises a surface-modifying agent comprising a plurality of non-photoactive nanoparticles. The nanoparticle systems may be distinguished from colloids (small particles suspended in solution) in that the nanoparticles are capable of forming a coating or layer after the composition is applied to a surface, whereas colloids are typically only thought of as being dispersed in another media.

The nanoparticle system can comprise materials, compositions, devices, appliances, procedures, methods, conditions, etc. serving a common purpose of modification of hard surfaces to bring about, if desired, the multi-use benefits of one or more of the following: improved wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency.

Nanoparticles, defined as particles with diameters of about 400 nm or less, are technologically significant, since they are utilized to fabricate structures, coatings, and devices that have novel and useful properties due to the very small dimensions of their particulate constituents. Nanoparticles with particle sizes ranging from about 1 nm to about 400 nm can be economically produced. Particle size distributions of the nanoparticles may fall anywhere within the range from about 1 nm, or less, to less than about 400 nm, alternatively from about 1 nm to less than about 100 nm, and alternatively from about 1 nm to less than about 50 nm. For example, a layer synthetic silicate can have a mean particle size of about 25 nanometers while its particle size distribution can generally vary between about 10 nm to about 40 nm. Alternatively, nanoparticles can also include crystalline or amorphous particles with a particle size from about 1, or less, to about 100 nanometers, alternatively from about 1 to about 50 nanometers. Nanotubes can include structures up to 1 centimeter long, alternatively with a particle size from about 1, or less, to about 50 nanometers.

Inorganic nanoparticles generally exist as oxides, silicates, carbonates and hydroxides. Some layered clay minerals and inorganic metal oxides can be examples of nanoparticles. Some layered clay minerals suitable for use in are smectites, kaolins, illites, chlorites, attapulgites and mixed layer clays. Smectites, for example, include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, penninite, donbassite, sudoite, pennine and clinochlore. Attapulgites include sepiolite and polygorskyte. Mixed layer clays include allevardite and vermiculitebiotite. Variants and isomorphic substitutions of these layered clay minerals offer unique applications.

The layered clay minerals may be either naturally occurring or synthetic. Some embodiments of the present invention may use natural or synthetic hectorites, montmorillonites and bentonites. Other embodiments may use the hectorites clays commercially available, and typical sources of commercial hectorites are the LAPONITES from Southern Clay Products, Inc., U.S.A; Veegum Pro and Veegum F from R. T. Vanderbilt, U.S.A.; and the Barasyms, Macaloids and Propaloids from Baroid Division, National Read Comp., U.S.A.

The inorganic metal oxides of the present invention may be silica- or alumina-based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms of alumina are commercially available in the form of Gibbsite, Diaspore, and Boehmite from manufactures such as Condea.

Natural Clays—Natural clay minerals typically exist as layered silicate minerals and less frequently as amorphous minerals. A layered silicate mineral has $SiO_4$ tetrahedral sheets arranged into a two-dimensional network structure. A 2:1 type layered silicate mineral has a laminated structure of several to several tens of silicate sheets having a three layered structure in which a magnesium octahedral sheet or an aluminum octahedral sheet is sandwiched between two sheets of silica tetrahedral sheets.

A sheet of an expandable layer silicate has a negative electric charge, and the electric charge is neutralized by the existence of alkali metal cations and/or alkaline earth metal cations. Smectite or expandable mica can be dispersed in water to form a sol with thixotropic properties. Further, a complex variant of the smectite type clay can be formed by the reaction with various cationic organic or inorganic compounds. As an example of such an organic complex, an organophilic clay in which a dimethyldioctadecyl ammonium ion (a quaternary ammonium ion) is introduced by cation exchange and has been industrially produced and used as a gellant of a coating.

Synthetic Clays—With appropriate process control, the processes for the production of synthetic nanoscale powders (i.e. synthetic clays) does indeed yield primary particles, which are nanoscale. However, the particles are not usually present in the form of discrete particles, but instead predominantly assume the form of agglomerates due to consolidation of the primary particles. Such agglomerates may reach diameters of several thousand nanometers, such that the desired characteristics associated with the nanoscale nature of the particles cannot be achieved. The particles may be deagglomerated, for example, by grinding as described in EP-A 637,616 or by dispersion in a suitable carrier medium, such as water or water/alcohol and mixtures thereof.

The production of nanoscale powders such as layered hydrous silicate, layered hydrous aluminum silicate, fluorosilicate, mica-montmorillonite, hydrotalcite, lithium magnesium silicate and lithium magnesium fluorosilicate are common. An example of a substituted variant of lithium magnesium silicate is where the hydroxyl group is partially substituted with fluorine. Lithium and magnesium may also be partially substituted by aluminum. In fact, the lithium magnesium silicate may be isomorphically substituted by any member selected from the group consisting of magnesium, aluminum, lithium, iron, chromium, zinc and mixtures thereof.

Synthetic hectorite was first synthesized in the early 1960's and is now commercially marketed under the trade name LAPONITE™ by Southern Clay Products, Inc. There are many grades or variants and isomorphous substitutions of LAPONITE™ marketed. Examples of commercial hectorites are Lucentite SWN™, LAPONITE S™, LAPONITE XLS™, LAPONITE RD™ and LAPONITE RDS™. One embodiment of this invention uses LAPONITE XLS™ having the following characteristics: analysis (dry basis) $SiO_2$ 59.8%, MgO 27.2%, $Na_2O$ 4.4%, $Li_2O$ 0.8%, structural $H_2O$ 7.8%, with the addition of tetrasodium pyrophosphate (6%); specific gravity 2.53; bulk density 1.0.

Synthetic hectorites, such as LAPONITE RD™, do not contain any fluorine. An isomorphous substitution of the hydroxyl group with fluorine will produce synthetic clays referred to as sodium magnesium lithium fluorosilicates. These sodium magnesium lithium fluorosilicates, marketed as LAPONITE™ and LAPONITE S™, may contain fluoride ions of up to approximately 10% by weight. It should be understood that the fluoride ion content useful in the compositions described herein can comprise any whole or decimal numeric percentage between 0 and 10 or more. LAPONITE B™, a sodium magnesium lithium fluorosilicate, has a flat, circular plate-like shape, and may have a diameter with a mean particle size, depending on fluoride ion content, that is any number (or narrower set of numbers) that is within the range of between about 25–100 nanometers. For example, in one non-limiting embodiment, LAPONITE B™ may be between about 25–40 nanometers in diameter and about 1 nanometer in thickness. Another variant, called LAPONITE S™, contains about 6% of tetrasodium pyrophosphate as an additive. In some instances, LAPONITE B™ by itself is believed, without wishing to be bound to any particular theory, to be capable of providing a more uniform coating (that is, more continuous, i.e., less openings in the way the coating forms after drying), and can provide a more substantive (or durable) coating than some of the other grades of LAPONITE™ by themselves (such as LAPONITE RD™). The coating preferably forms at least one layer of nanoparticles on the surface which has been coated, and is substantially uniform.

The ratio of the largest dimension of a particle to the smallest dimension of a particle is known as the particle's aspect ratio. The aspect ratio of the nanoparticles, in some cases, is of interest in forming films with the desired characteristics. The average aspect ratio of individual particles of LAPONITE™ B is approximately 20–40 and the average aspect ratio of individual particles of LAPONITE™ RD is approximately 10–15. A high aspect ratio is desirable for film formation using nanosized clay materials. The aspect ratio of the dispersed particles in a suitable carrier medium, such as water is also of interest. The aspect ratio of the particles in a dispersed medium can be considered to be lower where several of the particles are aggregated than in the case of individual particles. The aspect ratio of dispersions can be adequately characterized by TEM (transmission electron microscopy). LAPONITE B™ occurs in dispersions as essentially single clay particles or stacks of two clay particles. The LAPONITE RD™ occurs essentially as stacks of two or more single clay particles. Thus, the aspect ratio of the particles dispersed in the carrier medium can be affected if there is an aggregation of individual particles. In certain non-limiting embodiments, it may be desirable for at least some of (and preferably a plurality of) individual (non-aggregated) platelet and disc-shaped non-photoactive nanoparticles to have at least one dimension that is greater than or equal to about 0.5 nanometers, and an aspect ratio of greater than or equal to about 15. The aspect ratio of LAPONITE B™ is about 20–40 and the aspect ratio of LAPONITE RD™ is less than 15. Larger aspect ratios are preferred for platelet and disc-shaped particles than for rod-shaped particles.

The aspect ratio of rod-shaped particles, such as small boemite alumina (e.g., Disperal P2™), can be lower than the disc-shaped or platelet-shaped particles while maintaining adequate film-forming properties. In certain non-limiting embodiments, it may be desirable for at least some of (and preferably a plurality of) the individual rod-shaped non-photoactive nanoparticles to have at least one dimension that is greater than or equal to about 0.5 nanometers, and an aspect ratio of greater than or equal to about 3.

LAPONITE™ has the formula:

$$[Mg_wLi_xSi_8O_{20}OH_{4-y}F_y]^{z-}$$

wherein w=3 to 6, x=0 to 3, y=0 to 4, z=12−2w−x, and the overall negative lattic charge is balanced by counter-ions; and wherein the counter-ions are selected from the group consisting of selected $Na^+$, $K^+$, $NH_4^+$, $Cs^+$, $Li^+$, $Mg^{++}$, $Ca^{++}$, $Ba^{++}N(CH_3)_4^+$ and mixtures thereof.

Depending upon the application, the use of variants and isomorphous substitutions of LAPONITE™ provides great flexibility in engineering the desired properties of the coating composition of the present invention. The individual platelets of LAPONITE™ are negatively charged on their faces and possess a high concentration of surface bound water. When applied to a hard surface, the hard surface is hydrophilically modified and exhibits surprising and significantly improved wetting and sheeting, quick drying, uniform drying, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency properties. In addition, the LAPONITE™ modified surface exhibits some "self-cleaning" properties (dirt removal via water rinsing, e.g. from rainwater) and/or soil release benefits (top layers are strippable via mild mechanical action). The hydrophilicity can also provide the exposed layer of nanoparticles with resistance to soiling by hydrophobic types of soils.

In contrast to hydrophilic modification with organic polymers, benefits provided by LAPONITE™, either alone or in combination with a charged modifier, are longer lived. For example, sheeting/anti-spotting benefits are maintained on an automobile body and glass window after multiple rinses versus one rinse with tap water or rainwater versus on a surface coated with current hydrophilic polymer technology.

Inorganic Metal Oxides—Inorganic metal oxides generally fall within two groups-photoactive and non-photoactive nanoparticles. General examples of photoactive metal oxide nanoparticles include zinc oxide and titanium oxide. Photoactive metal oxide nanoparticles require photoactivation from either visible light (e.g. zinc oxide) or from UV light ($TiO_2$). Zinc oxide coatings have generally been used as anti-microbial agents or as anti-fouling agents.

Non-photoactive metal oxide nanoparticles do not use UV or visible light to produce the desired effects. Examples of non-photoactive metal oxide nanoparticles include, but are not limited to: silica and alumina nanoparticles, and mixed metal oxide nanoparticles including, but not limited to smectites, saponites, and hydrotalcite.

Boehmite alumina is a water dispersible, inorganic metal oxide having a mean particle size of about 25 nanometers in diameter and about 2–4 nanometers in thickness. Such product is commercially available, for example, under the trade name Disperal P2™.

Inorganic metal oxide nanoparticles provide an additional benefit above those of the layered clays where concentrated sols of inorganic metal oxides can be prepared without gelling. This is particularly advantageous for applications that utilize a dilution step prior to application of the coating composition. Additionally, inorganic metal oxide nanoparticles can provide tolerance to hard water used in making nanoparticle dispersions, diluting nanoparticles dispersion compositions, and the application of nanoparticle compositions wherein the surface contains hard water ions.

Charged Functionalized Molecules

The term "functionalize", as used herein, refers to altering the characteristics of a surface. The surface that is functionalized may be a hard surface (or substrate) that is coated with nanoparticles, or it may be the nanoparticles themselves. Functionalized molecules are molecules that provide such altering characteristics to the hard surface, to the nanoparticles, or serve to anchor or enhance adsorption onto the surfaces of the nanoparticles.

Hydrophilic modification of a hard surface (or substrate) can be augmented via use of nanoparticles such as LAPONITE™ as a basecoat or primer and then treating the negatively charged surface with functionalized charged molecules as a two-step process. Additional coatings of the nanoparticles and functionalized charged molecules can be added if desired, for example to provide alternating layers of the same in a process involving more than two steps.

Charged functionalized surface molecules may comprise at least two different types of functionalized surface molecules. Charged functionalized surface molecules may be selected from the group consisting of polymers, copolymers, surfactants and mixtures thereof. Functionalized surface molecules can also be selected from the group consisting of multi-valent inorganic salts consisting of $Ca^{+2}$, $Mg^{+2}$, $Ba^{+2}$, $Al^{+3}$, $Fe^{+2}$, $Fe^{+3}$, $Cu^{+2}$ and mixtures thereof, where an appropriate anion is used to balance the charge.

Sequential layering of LAPONITE™ and ethoxylated, quaternized oligoamines results in a reduction in the contact angles, and enhanced sheeting/wetting of the treated surface. Moreover, if the charged functionalized molecule species possess a lipophilic component, the LAPONITE treated surface can be hydrophobically modified. Net, the combination of nanoclay plus charge functionalized molecules provides a novel technique for tailoring the hydrophilic/lipophilic character of a hard surface.

Similarly, hydrophilic modification can be augmented via use of alumina as a basecoat or primer and then treating the positively charged surface with functionalized charged molecules as a two-step process. Specifically, sequential layering of alumina and hydrophilic anionic polymers results in enhanced sheeting/wetting of the treated surface. Moreover, if the charged functionalized molecule species possess a lipophilic component, the alumina treated surface can be hydrophobically modified. Net, the combination of inorganic metal oxides plus charged functionalized molecules provides a novel technique for tailoring the hydrophilic/lipophilic character of a hard surface.

I. Composition

If the coating is in the form of a composition, the coating composition may be in any form, such as liquids (aqueous or non-aqueous), granules, pastes, powders, spray, foam, tablets, gels, and the like. Granular compositions can be in "compact" form and the liquid compositions can also be in a "concentrated" form. The coating compositions of the present invention encompass compositions that are used on any suitable hard surface including, but not limited to: fiberglass, plastics, metals, glass, ceramic, wood, stone, concrete, asphalt, mineral, coated surfaces, painted surfaces and mixtures thereof.

In one embodiment, the hard surface coating composition comprises: (a) an effective amount of non-photoactive nanoparticles; (b) optionally one or more adjunct ingredients; and (c) optionally a suitable carrier medium.

In another embodiment, the hard surface coating composition comprises: (a) an effective amount of non-photoactive nanoparticles; (b) a surfactant; (c) optionally one or more adjunct ingredients; and (d) a suitable carrier medium.

Alternatively, an effective amount of one or more nanoparticles described above are included in compositions useful for coating a variety of hard surfaces in need of treatment. As used herein, "effective amount of one or more nanoparticles" refers to the quantity of nanoparticles of the present invention described hereinbefore necessary to impart the desired hard surface coating benefit in the specific composition (for example, an amount effective to provide a residual hydrophilic coating on a surface). Such effective amounts are readily ascertained by one of ordinary skill in the art and is based on many factors, such as the particular nanoparticle used, the hard surface coating application, the specific composition of the hard surface coating composition, and whether a liquid or dry (e.g., granular, powder) composition is required, and the like.

An effective amount of a non-photoactive nanoparticles in the present invention, such as a natural clay, synthetic clay or an inorganic metal oxide, requires that at least 10% of the target surface is modified to effect the desired benefits.

The concentration of nanoparticles in the material or the compositions described herein can range all the way up to 100%. A non-limiting example of the use of nanoparticles in such a high concentration would be if the nanoparticles alone were applied in the form of a powder to the surface to be treated.

The nanoparticle coating compositions described herein can provide the desired performance on surfaces, including vertical surfaces, even when relatively small quantities of the composition are used. For example, it is possible to coat a vertical surface with the nanoparticle coating composition in amounts of less than or equal to about 25 micrograms of nanoparticles/cm$^2$ of the surface, or alternatively any number of micrograms less than 25 (e.g., less than or less than or equal to about 20, 15, 10, 5, 3, 0.5, etc.). In other alternatives, the coat weight of nanoparticles on the surface can be expressed in terms of a range, including but not limited to any range of numbers, without the need for specifying the same, that is less the above coat weight (25 micrograms of nanoparticles/cm$^2$). The coating compositions can, as a result, be applied in the more convenient and economical form of a dilute liquid, rather than as a gel. The coating compositions in such embodiments, since applied as a thin layer, will quickly dry on the surface, and will not run or drip down a vertical surface. Coat weights of less than 3 $\mu$g/cm$^2$ have been found to produce residue-free coatings on high gloss surfaces, such as painted vehicle surfaces. (Of course, in other embodiments, and for other uses, higher coat weights could be used.)

In one non-limiting aspect of the present invention, the concentration of nanoparticles in the coating composition prior to application to a hard surface is less than or equal to about 50% by weight of the coating composition, or any number less than 50% of the weight of the coating composition (e.g., less than or equal to about 20% to less than or equal to about 1%, or less, for example when the coating composition is a liquid that is to be sprayed onto the hard surface; alternatively, less than or equal to about 0.5%, alternatively less than or equal to about 0.1%).

In one aspect of the present invention, the coating composition is prepared by dispersing the dry nanoparticle powder into deionized water to form a 1% concentrated mixture. This mixture is then applied to said surface by either spraying, dipping, painting, wiping, or other manner in order to deliver a coating, especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a nanoparticle gel with deionized water to form a 1% concentrated mixture. This mixture is then applied to said surface by either spraying, dipping, painting, wiping, or other manner in order to deliver a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a 10% concentrated boehmite alumina (e.g. Disperal P2™ from Condea, Inc.) coating composition with deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a 1% concentrated sodium magnesium lithium fluorosilicate (e.g. LAPONITE B™ from Southern Clay Products, Inc.) coating composition with deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a 1% concentrated lithium magnesium sodium silicate (e.g. Lucentite SWN™ from Kobo Products, Inc.) coating composition with deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by dispersing the dry nanoparticle powder into deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In other embodiments, the coating composition is prepared by dispersing the dry nanoparticle powder with a surfactant and a dispersant into tap water, so that the use of deionized water is not necessary. Two non-limiting examples of such a coating composition are provided in the Examples section at the end of this description. Examples of other suitable dispersants include, but are not limited to: polyacrylic acid, poly (acrylic/allyl alcohol), poly (acrylic/maleic), and other polycarboxylic acids, sodium tripolyphosphate, pyrophosphate, and the other dispersants and builders described herein. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In one non-limiting aspect, an effective amount of charged functionalized surface molecules that provide hydrophobic properties to the nanoparticle surface, generally modifies from about 1% to about 100% of the nanoparticle surface or from about 0.01 to about 5% by weight of the coating composition.

In other embodiments, rather than modifying the characteristic of the surface to be coated, the charged functionalized molecules can be used to aid in the delivery of the nanoparticles to the surface to be coated. For instance, in one non-limiting embodiment, a surfactant could be mixed with the nanoparticles in order to aid in the delivery of the nanoparticles to the surface to be coated in cases in which it is difficult to combine the nanoparticle coating with another carrier medium, or in which it is difficult to apply the nanoparticles to a particular surface. For example, if the nanoparticles are to be used with an organic clearcoat composition, it may be difficult to suspend the nanoparticles in the clearcoat composition, or to spread the nanoparticle coating on the surface of such a clearcoat composition. In such a case, the addition of a relatively small amount of surfactant (e.g., virtually any amount of surfactant or functionalized molecules, for example a stoichiometric amount) to the nanoparticles, will aid in overcoming these difficulties. In such a case, the amount of charged functionalized molecules can be less than about 0.01% of the coating composition.

Several non-limiting examples of various coatings and coating compositions wherein the nanoparticles may be employed are discussed in further detail below. Also, the coating compositions may include from about 0.001% to about 99.999%, alternatively from about 0.01% to about 99.99% by weight of the coating composition of the adjunct materials. In certain embodiments, the coating composition comprises less than or equal to about 10% (or less than about 10%) by weight of other ingredients other than the nanoparticles and the carrier medium, alternatively, less than or equal to any percentage less than 10 (e.g., less than or equal to about 5%, alternatively less than or equal to about 1%), of other ingredients.

As used herein, the coatings and "coating compositions" include hand and machine applied coatings, compositions, including additive coatings, additive compositions, and compositions suitable for use in the soaking and/or pretreatment of unclean or stained hard surfaces. The coatings, coating compositions and/or methods and/or articles of manufacture of the present invention can be used for all uses including manufacturing, commercial, industrial, institutional, agricultural and/or for domestic use.

When the coating compositions are formulated as compositions suitable for use in an enumerated method or article of manufacture, the coating compositions of the present invention alternatively contain both an effective amount of nanoparticles and a suitable carrier medium to form the nanoparticle system and may optionally include one or more of the following: a surfactant, a quantity of one or more charged functionalized surface molecules, photoactive nanoparticles, and one or more adjunct ingredients.

The coating compositions of the present invention can also be used as detergent additive products in solid or liquid form. Such additive products are intended to supplement or boost the performance of conventional coating compositions used to clean hard surfaces and can be added at any stage of the cleaning process, however addition of the transparent hard surface coating composition to a clean surface is more effective.

Aqueous liquid, coating compositions according to the present invention can also be in a "concentrated form", in such case, the concentrated liquid, coating compositions according the present invention will contain a lower amount of a suitable carrier medium, compared to conventional liquid, coating compositions. Typically the suitable carrier medium content of the concentrated system, hard surface coating composition is alternatively 99.99 to 50% by weight of the coating composition.

Aqueous liquid, coating compositions according to the present invention can also be in a "concentrated form" that is compatible with "tap water", in such case, the concentrated liquid, coating compositions according the present invention will contain a lower amount of a suitable carrier medium, compared to conventional liquid, coating compositions and a dispersant. Typically the suitable carrier medium content of the concentrated system, hard surface coating composition is alternatively 99.99 to 50% by weight of the coating composition. Typically the dispersant content of the concentrated system, hard surface coating composition is alternatively 0.001 to 10%.

The present invention includes liquid (with a compatible carrier) coating compositions, including aqueous liquid coating compositions. Aqueous liquid, coating compositions alternatively comprise in addition to the nanoparticle system described hereinabove, about 50% to about 99.99%, alternatively from about 80% to about 99.99%, by weight of liquid carrier or suitable carrier medium, such as an alcohol and/or water.

The aqueous liquid, coating compositions may also comprise one or more adjunct materials. The term "adjunct materials", as used herein, means any liquid, solid or gaseous material selected for aqueous liquid, coating compositions, alternatively compatible with the other ingredients present in the aqueous liquid, coating compositions. Examples of adjunct materials are described below in the section entitled "Optional Ingredients".

If the adjunct materials are not compatible with the other ingredients present in the aqueous liquid, coating compositions, then suitable methods of keeping the incompatible adjunct materials and the other ingredients separate (not in contact with each other) until combination of the two components is appropriate can be used. Suitable methods can be any method known in the art, such as gelcaps, encapsulation, tablets, physical separation, etc.

The coating compositions can comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally an effective amount of photoactive nanoparticles; (e) optionally one or more adjunct ingredients; and (f) a suitable carrier medium.

The coating compositions of the present invention can also be used as detergent additive products in liquid form for automatic dishwashing machines. Such additive products are intended to supplement or boost the performance of conventional coating compositions and can be added at any stage of the dishwashing process, however, best results are achieved in the rinsing cycle.

Further, the coating compositions according to the present invention may be isotropic (clear, single phase) liquids, aqueous gels, phase-separated liquid compositions and/or colored liquid compositions.

In certain embodiments, the coating compositions are non-thixotropic. That is, the coating compositions, in such embodiments, do not have a different state when at rest (such as a gel, when they are not under shear load) than when activated (such as a liquid, when under shear load), such that the coating composition tends to return to its at rest state (e.g., a gel) after the shear load is removed. For the purposes of this description, a coating composition will not be considered to be thixotropic if it is placed in another state in other manners, such as by diluting a gel coating composition with another material to form a liquid.

The coating compositions according to the present invention may be of any suitable viscosity. The viscosity of the coating compositions should be such that they are able to be effectively applied to the surface to be coated. Thus, for instance, if the coating compositions are to be applied to a hard surface that has portions that are sloped (their slope has a vertical component), the hard surface coating composition should preferably either be applied in a relatively low quantities that they are able to dry on the surface without running off as discussed above, or if applied in greater quantities, they should not have such a low viscosity that the coating composition runs off the surface to be coated. However, embodiments in which there is run off are not excluded from the scope of the invention. Non-limiting examples of suitable viscosities are less than or equal to about 1,000 Cps at 100 rpm, or any increment of 10 less than 1,000 (including, but not limited to 100 Cps, 40 Cps, and 1 Cps (the latter being the viscosity of water)). The method for determining the viscosity of the coating compositions is set forth in the Test Methods section.

The dry coating compositions of the present invention can comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally one or more adjunct ingredients; and (e) an optionally, a suitable carrier medium.

The dry coating compositions of the present invention can also be used as detergent additive products in powder, granule or tablet form for automatic dishwashing machines. Such additive products are intended to supplement or boost the performance of conventional coating compositions and can be added at any stage of the dishwashing process, however, best results are achieved in the rinsing cycle.

Further, the dry coating compositions according to the present invention may be in powder, granule, tablet or encapsulated complex form.

Suitable Carrier Medium

The carrier medium can form part of the coating composition, or it can comprise the medium in which the nanoparticles are carried (or transported) for application to the hard surface.

Several non-limiting examples of types of carrier mediums are provided by way of explanation, and not by way of limitation. In one example, the coating composition can be provided in the form of an aqueous liquid in a container, and the liquid can be sprayed onto a hard surface. In such a case, the aqueous liquid carrier in the container holding the coating composition may be referred to herein as the "static carrier". When this coating composition is sprayed onto the hard surface, the liquid droplets in the spray may be referred to herein as the "dynamic carrier" (the medium that transports the nanoparticles to the surface in order to contact the surface). In another example, the coating composition may exist in a gel form in a container (the gel would be the form of the static carrier) and the gel could be diluted with water and sprayed as a liquid onto the hard surface (in which case the liquid spray would be the dynamic carrier). The term "carrier", as used herein, includes both static and dynamic carriers.

Suitable carrier mediums include liquids, solids and gases. One suitable carrier medium is water, which can be softened (Ca and Mg ions removed), distilled, deionized, or tap water. Water is valuable due to its low cost, availability, safety, and compatibility. In certain embodiments in which the carrier medium is aqueous, it may be preferred that at least some of the aqueous carrier is purified beyond the treatment it received to convert it to tap water (that is, the tap water is post-treated, e.g., deionized, distilled, or softened). The purified water could comprise: all or part of the static carrier for the composition; all or part of the dynamic carrier; or, all or part of both. Though aqueous carrier mediums are more common than dry, nonaqueous mediums, the present invention can exist as a dry powder, granule or tablet or encapsulated complex form.

Optionally, in addition to water, the carrier can contain a low molecular weight organic solvent that is highly soluble in water, e.g., ethanol, methanol, propanol, isopropanol and the like, and mixtures thereof. Low molecular weight alcohols can allow the treated hard surface to dry faster. The optional water soluble low molecular weight solvent can be used at a level of up to about 50%, typically from about 0.1% to about 25%, alternatively from about 2% to about 15%, alternatively from about 5% to about 10%, by weight of the suitable carrier medium. Factors that need to consider when a high level of solvent is combined with the suitable carrier medium are odor, flammability, dispersancy of the nanoparticle and environment impact.

In one non-limiting embodiment, the carrier can comprise any known clearcoat composition. U.S. Pat. No. 5,853,809 describes one non-limiting example of a clearcoat composition.

In other embodiments, the carrier can be an airstream. For instance, the material, or the composition can be added into a stream of moving air, and the air can convey the non-photoactive nanoparticles to the surface to be treated.

In other embodiments, the coating material or composition can simply be dropped through the air by gravity onto the surface to be treated (one example of which would be by sifting a solid material onto the surface).

Classes of Functionalized Surface Molecules

Polymer Classes and Examples

Polymers are optional ingredients in the compositions of the present invention. If desired, the compositions may be substantially free of polymers.

If polymers are used, in one non-limiting aspect of the invention, they can be used as part of a two (or more) step process. In such a process, the nanoparticle composition is applied to the hard surface to form a layer of nanoparticles on the hard surface. After this layer is formed and dried, a composition comprising the desired polymers can be applied to the layer of nanoparticles to further modify the nanoparticle-coated surface. Without wishing to be bound by any particular theory, when the polymer composition is applied in this way, it is believed that the nanoparticle layer anchors the polymers to the hard surface. This can be used to provide the nanoparticle coated surface with different properties than are provided by the nanoparticles alone. Using this two-step process may provide advantages over applying the polymers to the nanoparticles and then applying the polymer coated nanoparticles to the hard surface. One advantage is that the two-step process provides a more continuous covering on the surface by virtue of the uniformity of the initial layer of nanoparticles, than the less continuous structure formed by depositing nanoparticles with polymers attached thereto onto the hard surface. Another advantage is that the durability of the polymer layer can be increased by virtue of enhanced interaction with the nanoparticle-coated surface compared to the unmodified surface.

Polymers and copolymers with at least one segment or group which comprises functionality that serves to anchor or enhance adsorption on nanoparticle surfaces may be used. These polymers may also comprise at least one segment or group that serves to provide additional character to the polymer when adsorbed on a nanoparticle. Non-limiting examples of additional character may include hydrophilic or hydrophobic properties. Note that in some cases, the anchoring segment may also serve to provide the additional character.

Examples of the anchoring segments or groups include: polyamines, quaternized polyamines, amino groups, quaternized amino groups, and corresponding amine oxides; zwitterionic polymers; polycarboxylates; polyethers; polyhydroxylated polymers; polyphosphonates and polyphosphates; and polymeric chelants.

Examples of the hydrophilizing segments or groups include: ethoxylated or alkoxylated polyamines; polyamines; polycarboxylated polyamines; water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides and polymers thereof; water soluble zwitterionic groups and polymers thereof; water soluble amides and polyamides; and water soluble polymers and copolymers of vinylimidazole and vinylpyrrolidone.

Examples of the hydrophobizing segments or groups include: alkyl, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butylene oxide), poly(tetramethylene oxide), and poly(dodecyl glycidyl ether); and hydrophobic polyesters such as polycaprolactone and poly(3-hydroxycarboxylic acids).

Hydrophilic Surface Polymers

Examples of hydrophilic surface polymers include, but are not limited to: thoxylated or alkoxylated polyamines; polycarboxylated polyamines; polycarboxylates; polyethers; polyhydroxyl materials; polyphosphates and phosphonates.

Hydrophobic Surface Polymers

Alkylated polyamines include, but are not limited to: polyethyleneimine alkylated with fatty alkylating agents such as dodecyl bromide, octadecyl bromide, oleyl chloride, dodecyl glycidyl ether and benzyl chloride or mixtures thereof; and polyethyleneimine acylated with fatty acylating agents such as methyl dodecanoate and oleoyl chloride; silicones including, but not limited to: polydimethylsiloxane having pendant aminopropyl or aminoethylaminopropyl groupsl and fluorinated polymers including, but not limited to: polymers including as monomers (meth)acrylate esters of perfluorinated or highly fluorinated alkyl groups.

Non-Polymeric Materials

Molecules with at least one segment or group which comprises functionality that serves to anchor or enhance adsorption on nanoparticle surfaces can also be used. These molecules also comprise at least one segment or group that serves to provide additional character to the molecule when adsorbed on a nanoparticle. Non-limiting examples of additional character may include hydrophilic or hydrophobic properties. Note that in some cases, the anchoring segment may also serve to provide the additional character.

Examples of the anchoring segments or groups that may also serve as the hydrophilizing segment include amino groups, quaternized amino groups, and corresponding amine oxides groups; zwitterionic groups; and carboxylate groups.

Examples of the hydrophobizing segments or groups include alkyl, aryl, alkaryl, siloxane, polysiloxane, fluoroether, and fluoroalkyl surfactants with cationic, zwitterionic, semi-polar, nonionic, or anionic head groups.

Examples of Non-Polymeric Surface Modifying Materials

Fatty amines and quats including: ditallowdimethylammonium chloride; octadecyltrimethylammonium bromide; dioleyl amine; and Benzyltetradecyldimethylammonium chloride can also be used.

Examples of fluorocarbon-based surfactants include: 1-propanaminium, 3-[[(heptadecafluorooctyl)sulfonyl] amino]-N,N,N-trimethyl-, iodide (9CI)

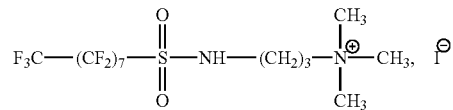

1-propanaminium, 3-[(8-chloro-2,2,3,3,4,4,5,5,6,6,7,7,8,8-tetradecafluoro-1,1-oxooctyl)amino]-N,N,N-trimethyl-, methyl sulfate (9CI)

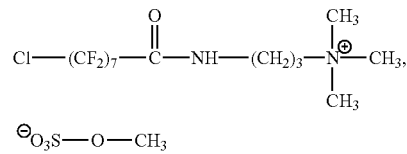

Silicone-based surfactants include: 1-propanaminium, N,N,N-trimethyl-3-[1,3,3,3-tetramethyl-1-[(trimethylsilyl) oxy]disiloxanyl]-, bromide (9CI)

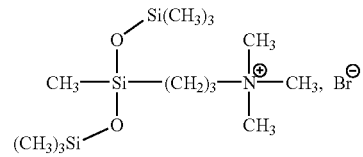

Fatty zwitterionic surfactants include: 1-dodecanaminium, N-(2-hydroxy-3-sulfopropyl)-N,N-dimethyl-, inner salt (9CI)

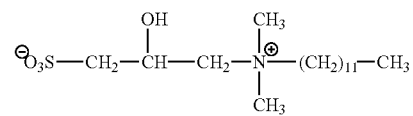

Fatty amine oxides such as hexadecyldimethylamine oxide are included. Fatty anionic surfactants include: Sodium oleyl sulfate; potassium oleate; sodium dodecylbenzenesulfonate; sodium tetradecyl sulfate; and disodium 2-hexadecenylbutanedioate.

Surfactants

Surfactants are an optional ingredient in some embodiments of the present invention. Surfactants are especially useful in the coating composition as wetting agents to facilitate the dispersion of nanoparticles onto a hard surface. Surfactants are alternatively included when the coating composition is used to treat a hydrophobic hard surface or when the coating composition is applied with a spray dispenser in order to enhance the spray characteristics of the coating composition and allow the coating composition, including the nanoparticles, to distribute more evenly. The spreading of the coating composition can also allow it to dry faster, so that the treated material is ready to use sooner. For concentrated compositions, the surfactant can facilitate the dispersion of many adjunct ingredients such as antimicrobial actives and perfumes in the concentrated aqueous compositions.

Suitable surfactants can be selected from the group including anionic surfactants, cationic surfactants, nonionic surfactants, amphoteric surfactants, ampholytic, zwitterionic surfactants, and mixtures thereof. Examples of suitable nonionic, anionic, cationic, ampholytic, zwitterionic and semi-polar nonionic surfactants are disclosed in U.S. Pat. Nos. 5,707,950 and 5,576,282. Nonionic surfactants may be characterized by an HLB (hydrophilic-lipophilic balance) of from 5 to 20, alternatively from 6 to 15.

When a surfactant is used in the coating composition, it may be added at an effective amount to provide one, or more of the benefits described herein. Typically, surfactants can be included in an amount from about 0.01% to about 15% by weight of the composition, or any amount or range within this range, including, but not limited to from about 0.01% to about 5%, 0.01% to about 3%, from about 0.01% to about 0.5%, however, any amount of surfactant can be used.

An alternative type of surfactant is ethoxylated surfactant, such as addition products of ethylene oxide with fatty alcohols, fatty acids, fatty amines, etc. Optionally, addition products of mixtures of ethylene oxide and propylene oxide with fatty alcohols, fatty acids, and fatty amines can be used. The ethoxylated surfactant includes compounds having the general formula:

$$R^8—Z—(CH_2CH_2O)_sB$$

wherein $R^8$ is an alkyl group or an alkyl aryl group, selected from the group consisting of primary, secondary and branched chain alkyl hydrocarbyl groups, primary, secondary and branched chain alkenyl hydrocarbyl groups, and/or primary, secondary and branched chain alkyl- and alkenyl-substituted phenolic hydrocarbyl groups having from about 1 to about 20 carbon atoms, alternatively from about 8 to about 18, alternatively from about 10 to about 15 carbon atoms; s is an integer from about 2 to about 45, alternatively from about 2 to about 20, alternatively from about 2 to about 15; B is a hydrogen, a carboxylate group, or a sulfate group, or a lower alkyl group, or a $C_3$ and above hydroxyalkyl group; and linking group Z is —O—, —C(O)O—, or —C(O)N(R)—, and mixtures thereof, in which R, when present, is $R^8$ or hydrogen.

Another class of alternative surfactants that are useful in the formulation of the coating compositions are silicone surfactants, also known as silicone superwetting agents. They can be used alone and/or alternatively in combination with the alternative alkyl ethoxylate surfactants described herein above. Nonlimiting examples of silicone surfactants are the polyalkylene oxide polysiloxanes having a dimethyl polysiloxane hydrophobic moiety and one or more hydrophilic polyalkylene oxide side chains, and having the general formula:

$$R^1—(CH_3)_2SiO—[(CH_3)_2SiO]_a—[(CH_3)(R^1)SiO]_b—Si(CH_3)_2—R^1$$

wherein a+b are from about 1 to about 50 alternatively, and each $R^1$ is the same or different and is selected from the group consisting of methyl and a poly(ethyleneoxide/propyleneoxide) copolymer group having the general formula:

$$—(CH_2)_nO(C_2H_4O)_c(C_3H_6O)_dR^2$$

wherein n is 3 or 4; total c (for all polyalkyleneoxy side groups) has a value of from 1 to about 100, alternatively from about 6 to about 100; total d is from 0 to about 14; alternatively d is 0; total c+d has a value of from about 5 to about 150, alternatively from about 9 to about 100 and each $R^2$ is the same or different and is selected from the group consisting of hydrogen, an alkyl having 1 to 4 carbon atoms, and an acetyl group, alternatively hydrogen and methyl group. Each polyalkylene oxide polysiloxane has at least one $R^1$ group being a poly(ethyleneoxide/propyleneoxide) copolymer group. Silicone superwetting agents are available from Dow Corning as silicone glycol copolymers (e.g. Q2-5211 and Q2-5212).

The surfactant is preferably formulated to be compatible with the nanoparticle system, the carrier medium and any optional adjunct ingredients present in the coating composition. For the hard surface coating compositions, this may mean that the surfactants are of type that (as opposed to detersive surfactants) is low sudsing and low foaming (since it is generally undesirable for the coating to have suds or foam therein). Low foaming nonionic surfactants can be described in terms of their cloud point. Low foaming nonionic surfactants typically have a cloud point below 30° C. Non-limiting descriptions of low cloud point nonionic surfactants are contained in U.S. Pat. Nos. 6,013,613 and 6,034,044. Amphoteric and anionic surfactants can be considered to be low sudsing and low foaming if they exhibit a Kraft Temperature of below 30° C.

Optional Ingredients

The coating compositions can contain other optional ingredients, including but not limited to alkalinity sources, anti-corrosion agents, antimicrobial preservatives, antioxidants, anti-static agents, anti-tarnish agents, bleaches, bleach activators, bleach catalysts, bluing agents, builders, carriers, chelating agents, aminocarboxylate chelators, colorants, color speckles, conditioners, hydrolyzable cosurfactants, dyes, dye transfer agents, dispersants, enzymes, non-activated enzymes, enzyme stabilizing systems, filler salts, fluorescers, fungicides, germicides, hydrotropes, metallic salts, photoactive inorganic metal oxides, photoactive nanoparticles, organic solvents, odor-controlling materials, optical brighteners, soil release polymers, perfumes, photoactivators, polymers, preservatives, processing aids, pigments, and pH control agents as described in U.S. Pat. Nos. 5,705,464; 5,710,115; 5,698,504; 5,695,679; 5,686,014; 5,576,282; and 5,646,101, silvercare agents, solubilizing agents, suds suppressors, surfactants, water-soluble bicarbonate salts, wetting agents, UV absorbers, zeolites, and mixtures thereof. These optional ingredients may be included at any desired level.

II. Methods of Use

In General

The coating compositions can, in some embodiments, be formed and used by (a) mixing the nanoparticles in suitable carrier medium to form the coating composition; (b) optionally mixing the nanoparticles dispersed in suitable carrier medium with adjunct ingredients to form said coating composition; (c) optionally mixing nanoparticles dispersed in suitable carrier medium with surfactant to form a coating composition; (d) optionally mixing nanoparticles dispersed in suitable carrier medium with adjunct ingredients and surfactant to form said coating composition; (e) applying the coating composition to a hard surface; (f) allowing the coating composition to dry, or actively drying the coating composition, or otherwise curing the coating composition; and (g) optionally repeating any of steps (a) through (f) as needed. In some embodiments, it may be desirable for step (f) to be carried out without rinsing or agitating the coating composition during drying.

The methods of use can comprise any of the following non-limiting methods: methods of forming a substantially clear coating; methods of providing a hard surface with multiple benefits; methods of providing a surface with quick drying properties; methods of providing a surface with improved soil removal; methods of providing a self-cleaning surface; methods for providing a surface with anti-soil deposition properties and/or cleaner appearance; methods for providing a surface with enhanced gloss; methods for providing an article with enhanced color; methods for improving the smoothness of a surface; methods for reducing friction on an article; methods for minor surface defect repair; methods for forming a protective coating on a surface; methods for cleaning a surface; methods for modifying a hard surface to increase the receptivity of the surface to the subsequent application of a substance; methods for providing a surface with multi-use properties; and combinations of these and other methods.

Distribution of the coating composition can be achieved by using a spray device, an immersion container, a spray hose attachment, or an applicator, such as a fabric, a porous article such as a sponge, or roller, a pad, etc., alternatively a spray dispenser. The coating compositions and articles of the present invention which contain the nanoparticle system can be used to treat all hard surfaces to provide at least one of the following improved durable benefits: improved hard surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency.

In one aspect of the present invention, an effective amount of the liquid coating composition of the present invention is alternatively sprayed onto hard surfaces and/or hard surface articles include, but are not limited to: interior and exterior glass windows, walls and doors; exterior vehicle bodies, including but not limited to auto bodies, trucks, trains, boats and planes; ceramic tile, floors and walls; bathroom and kitchen countertops; appliances; metal fixtures, siding and roofing; dishware; wood furniture, flooring and wall treatments; stone tiles and walls; asphalt roofing, siding and driveways; jewelry; exterior building surfaces; painted and coated surfaces, etc. When the coating composition is sprayed onto a hard surface, an effective amount of the nanoparticle system should be deposited onto the hard surface, with the hard surface becoming damp or totally saturated with the coating composition. The hard surface coating composition can also be applied to a hard surface via roll coating, curtain coating, a dipping and/or soaking process in an immersion container. Any of the application steps can be followed by a drying, or curing step. The steps in some representative, but non-limiting examples of the application process are described in greater detail below.

In one non-limiting aspect of the present invention, the coating composition is used to apply a coating on the surface of a vehicle, such as an automobile. The steps in applying the coating composition can involve one or more of the following steps, in addition to a step of applying the coating composition: a pre-wash step; a washing step, such as with soap and a sponge to produce lather; a rinse step; an activated or purified rinse step; a step for applying the coating composition; and a drying step. These steps can be performed by consumers at home, such as if they are provided with the components needed to carry out the steps in the form of a kit, such as a car care kit. Instructions can be provided. Alternatively, the steps can be performed in a commercial operation, such as at a car wash, which may be of the automatic type, or the "self serve" type where customers use a wash bay to spray their car clean. These steps can be adapted to apply the coating composition to any other types of hard surfaces.

Applying a Coating Composition Comprising Non-Photoactive Nanoparticles to a Surface The coating composition comprising the non-photoactive nanoparticles is applied to the surface. The surface should preferably be as clean as possible, although cleaning is not a required step in applying the coating composition. The coating composition can be applied to the surface while the surface is still wet from washing with purified rinse water, or when the surface of the surface is dry. The treating composition can be applied to the surface in any suitable manner including, but not limited to pouring, wiping (such as with a sponge, cloth, or the like), and spraying.

In embodiments using aqueous liquid treating compositions comprising non-photoactive nanoparticles, the composition should first be shaken to ensure that the nanoparticles are adequately dispersed in the solution before it is applied to the surface.

It has been found that the properties of the treating composition and the manner of applying the treating composition can have a considerable impact on the final appearance of the coated surface, particularly high gloss surfaces, such as painted vehicle surfaces. It is not trivial to deliver a residue-free nanoparticle film that provides the desired hydrophilic surface modification. This is particularly true in the case of certain conditions. For example, hot weather conditions can cause the treating composition to partially dry before it spreads sufficiently to form the desired coating. Direct sunlight can also impact the coating formed. Wind can affect the coating by creating unevenness in the coating where the coating is disturbed by the wind. In addition, the manner of application such as the manner and amount of the coating composition that is applied can have a significant impact on the final appearance of the surface. It is, therefore, desirable to develop a treating composition that is not overly sensitive to these conditions, and to apply the treating composition in a manner that forms a residue-free nanoparticle film that provides the desired hydrophilic surface modification.

It has been found that when the treating composition comprises LAPONITE B™ nanoparticles, it is capable of providing a more uniform coating (that is, more continuous, i.e., less openings in the way the coating forms after drying), and can provide a more substantive (or durable) coating than some of the other grades of LAPONITE™ by themselves (such as LAPONITE RD™). The coating preferably forms at least one layer of nanoparticles on the surface which has been coated, and is substantially uniform.

Figure 7:
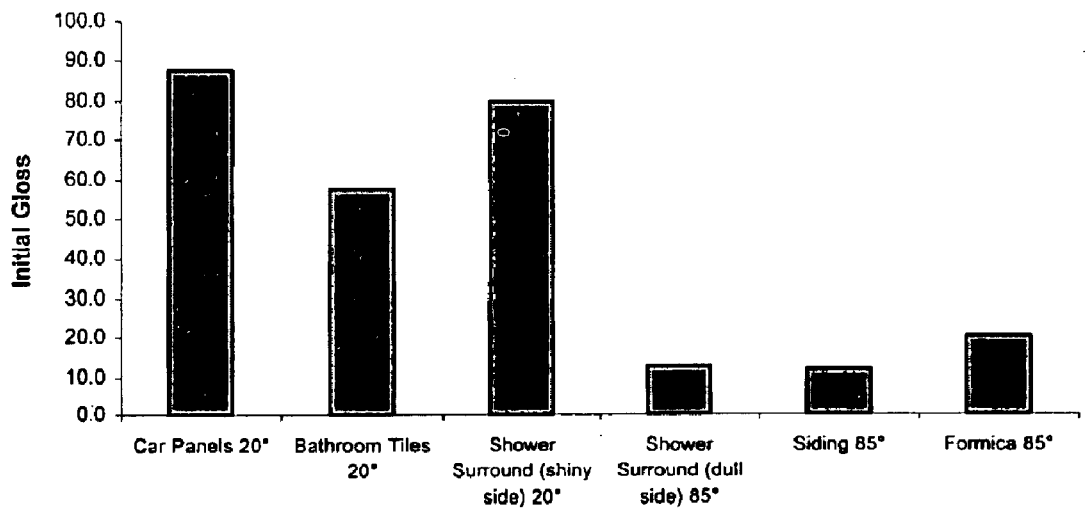
FIG. 7 is a graph showing the initial gloss of several surfaces before being treated with a composition comprising LAPONITE B® synthetic layered silicate.
Figure 8:
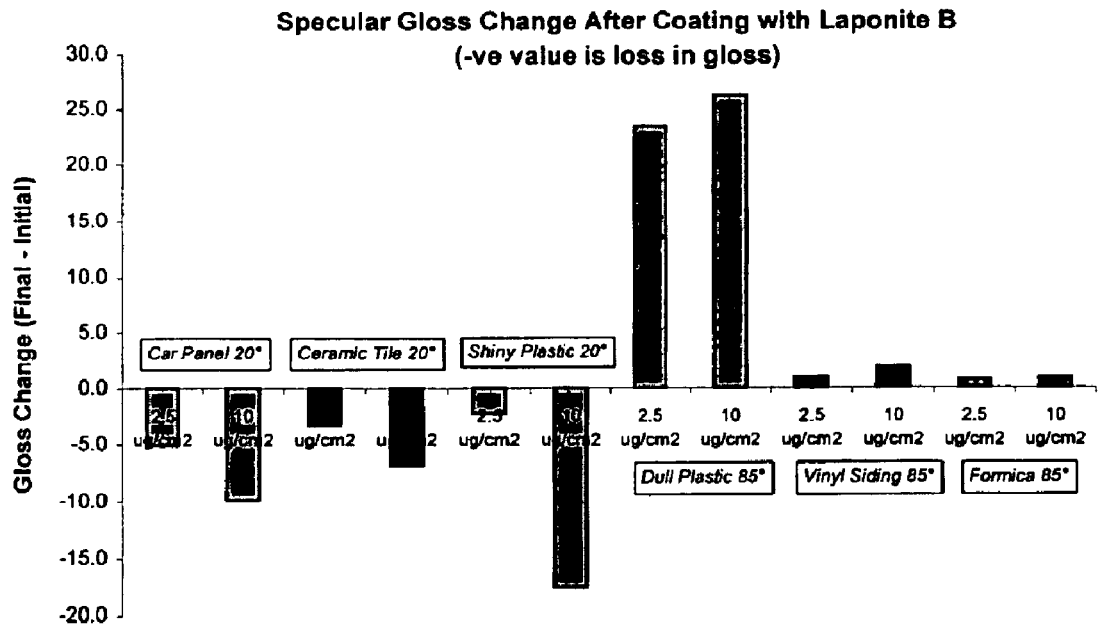
FIG. 8 is a graph showing the specular gloss change of these surfaces after being treated with a composition comprising LAPONITE B® synthetic layered silicate where the gloss change is shown in terms of change in specular gloss value.
Figure 9:
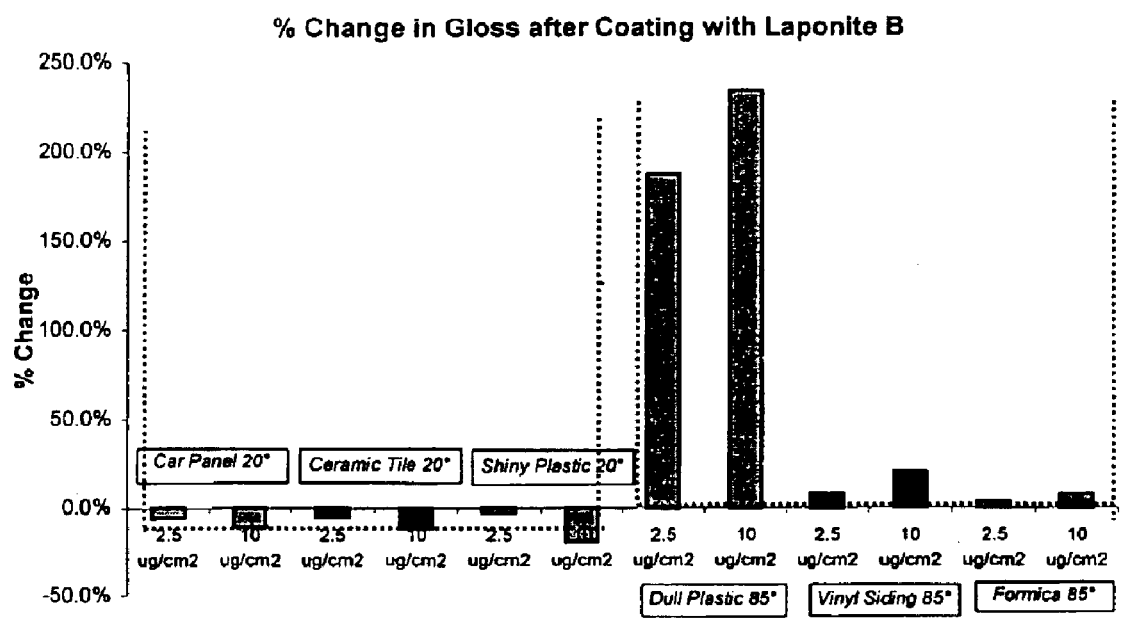
FIG. 9 is graph showing the specular gloss change of these surfaces after being treated with a composition comprising LAPONITE B® synthetic layered silicate where the gloss change is shown in terms of percentage change in specular gloss value.

It has also been found that when the treating composition comprises certain surfactants, a more suitable coating is formed than when using other surfactants. The coating formed thereby is much less effected by the weather conditions. The use of the preferred types of surfactants described herein, such as MIN-FOAM™ surfactant, also provides a suitable surface coating using using a much lesser amount of non-photoactive nanoparticles, as well as a lesser amount of the sufactant. The reduction in the amount of non-photoactive nanoparticles may approach one-half of the amount of non-photoactive nanoparticles that must be used with other types of surfactants. The MIN-FOAM™ surfactant uses up to 15% less surfactant to deliver the LAPONITE B™ to the surface. Without wishing to be bound to any particular theory, this is believed to be due to the low critical micelle concentration (CMC) of the MIN-FOAM™ surfactant. Additionally, the MIN-FOAM™ surfactant produces less visible residue due to lower suds generating when the composition is delivered to the substrate using a sprayer. However, certain types of sprayers, including, but not limited to electrostatic sprayers, may cause fewer suds or bubbles to be introduced into the treating composition during application to the surface, which form suitable coatings with less visible residue under a wider variety of conditions.

In one non-limiting embodiment, the treating composition is applied directly to the surface of a vehicle using a cloth, sponge, or foam squeegee. A treating composition comprising about 0.055% of nanoparticles can be applied directly to the surface of the vehicle in this manner. The painted surfaces and windows of an average size car can be coated with approximately 1 L to 1.5 L of such a treating composition.

In another non-limiting embodiment, the treating composition is sprayed onto the surface of the vehicle. The treating composition may be sprayed onto the surface of the vehicle at a flow rate that is less than or equal to about 8 gal./min. (about 30 L/min) for hose-end type sprayers, or any flow rate less than that flow rate and all such spray rates, including, but not limited to less than or equal to about 0.1 gal./min. (about 0.38 L/min.), or less than or equal to about 0.05 gal./min. (about 0.19 L/min.) are incorporated herein. It has been found that the typically organic-based painted and/or clear coat-coated surfaces together with the windows of an average size car can be coated with approximately 1 L to 1.5 L of such a coating composition using a spraying method.

Forming a Wet Film of Nanoparticles

The preceding step preferably forms a substantially uniform wet aqueous film comprising a plurality of nanoparticles, on the surface. Uniform coverage of the surface is desired in order to provide the benefits described herein to the entire surface to be treated.

The wet film should be capable of drying to a dry state. Between the wet state and the dry state, the film will typically pass through various partially dried states. In order to form a dry film that has the desired uniform characteristics described herein, the wet film should be as free as possible from film imperfection-producing substances. Therefore, a step in the process may include at least partially removing imperfection-producing substances from the surface to be coated and from the wet film. Such imperfection-producing substances may include, but are not limited to deposits which can be left by tap water, air bubbles, etc. The wet film should preferably be spread uniformly across the surface, and preferably should not develop breaks in the uniformity during the drying process.

Air bubbles in the wet film can, in certain circumstances, cause serious defects in the finally-formed dry film. In certain embodiments, it is desirable for the wet film to have less than 61 (or less than or equal to 60) defects that are greater than or equal to 1.75 mm in width per 100 $cm^2$ of the surface as measured at any time more than 30 seconds after the wet film is formed on the surface. If the air bubbles are of a relatively small size (e.g., in some cases having a mean size less than or equal to about 4 mm (e.g. 3.75 mm)) or there are a limited number of bubbles of a size greater than or equal to about 1.75 mm, or if they break while the wet film is still in a partially dried state, this can minimize defects in the dry film. When air bubbles break when the wet film is still in a sufficiently early partially dried state, the adjacent portions of the wet film can flow into the openings created when the air bubbles break, and fill the same to eliminate any gaps in the dry film. Therefore, the wet film is preferably substantially free of air bubbles that break after the wet film is in a partially dried state. For this reason, it is desirable, when spraying the coating composition on the surfaces, to select a type of sprayer that will minimize the quantity and size of air bubbles in the wet film.

Allowing the Coating Composition to Dry on the Surface Before the Surface is Contacted by Water to Form a Dry Film on the Surface The surface with the wet film of treating composition thereon should preferably be allowed to dry. The surface should be allowed to dry without agitation, scrubbing, buffing, or otherwise disturbing the treated surface (that is, the wet film). In certain embodiments, the wet film should be allowed to dry for at least about 15 minutes, preferably at least about one-half hour, more preferably at least about 2 hours, more preferably still at least about 4 hours, and most preferably up to about 24 hours before any water contacts the treated surface.

After drying, the coating composition forms a dry film on the surface. The coating film at least partially covers the surface. The coating preferably forms a dry film comprising at least one layer of nanoparticles on the surface which has been coated, and is substantially uniform. In certain embodiments, the dry film comprises primarily (or alternatively, consists essentially of) nanoparticles, and some remaining amounts of water and, in some cases, a wetting agent or surfactant. The dry film can have any suitable amount of nanoparticles therein. Preferably, the dry film has a sufficient amount of nanoparticles to provide the surface of the vehicle with the desired hydrophilicity. Preferably, the dry film comprises non-photoactive nanoparticles in an amount greater than or equal to about 0.2 $\mu g/cm^2$ of the surface area treated. In certain embodiments, the dry film comprises less than 3 $\mu g/cm^2$ of non-photoactive nanoparticles relative to the area of the surface treated for a residue-free appearance. In certain embodiments, if the coating film comprises other materials, such as a binder material, the amount of binder material in the coating film may be less than a functional level of binder material. In certain embodiments, if the coating film comprises a peptizer, the amount of peptizer may be less than 3%. The term "peptizer", as used herein, includes, but is not limited to sodium tripolyphosphate, sodium orthophosphate, tetrasodium pyrophosphate. The dry film can provide the composite surface (or coated surface) with any suitable degree of hydrophilicity described herein. In preferred embodiments, the contact angle of distilled water on the dry film is less than or equal to about 500, or less than or equal to any number of degrees less than 50° (including, but not limited to less than, or less than or equal to, about 35°, 25°, 20°, 15°, etc.).

It is often desirable for the dry film to be as defect-free as possible. In certain embodiments, the dry film may have visual scores under the Visual Grading Test in the Test Methods section of greater than or equal to −2. Preferably, the dry film has a thickness of less than, or less than or equal to, about 400 nm, or less than, or less than or equal to, any number of nanometers less than 400, including, but not limited to 300, 200, etc. The thinner dry films will typically have better transparency.

In certain non-limiting embodiments, the treating composition enhances the gloss of surfaces that are initially dull, preferably by at least about 10%. In the case of surfaces that have a high initial gloss, in certain embodiments, the treating composition may either maintain or enhance the initial gloss, or does not cause more than a 10% reduction in the gloss. For example, surfaces with an initial gloss reading at 60° geometry of greater than or equal to 10 are preferably treated with a treating composition which results in less than 10% reduction of specular gloss value after treatment. Surfaces with an initial gloss reading at 60° geometry of less than 10 are preferably treated with a treating composition which results in greater than 10% increase of specular gloss value after treatment. FIG. 7 shows the initial gloss of several surfaces before being treated with a composition comprising LAPONITE B®. FIGS. 8 and 9 show examples that might represent the specular gloss change of these surfaces after being treated with a composition comprising LAPONITE B® where the gloss change is shown in terms of change in specular gloss value and percentage change in gloss, respectively.

Increasing the Durability of the Coating

The hard surface coating composition can be applied to the hard surface at any suitable air temperature. It has been found that the hard surface coating composition can be applied at any temperature above freezing. For instance, the coating composition can be applied at temperatures as low as 1°, 5°, 10°, or 15° C.

The hard surface can then be subjected to conditions so as to remove water from, cure or otherwise dry the coating composition. The drying step can comprise air drying in ambient conditions. Alternatively, the drying step can comprise actively drying or curing the coating composition by utilizing any technology known for accelerating a drying or curing process. The term "actively curing", as used herein, refers to any technique used to accelerate the curing process beyond merely allowing the coating composition to dry under ambient conditions. For instance, known cross-linking agents can be incorporated into the composition to cure the same. Although various methods of curing may be used, thermal or heat curing, or heat drying is preferred. The hard surface coating composition can be heat dried at any air temperature which is above the ambient temperature (which air temperature of drying may, for example, be greater than or equal to about any five degree increment above 0° C.). Generally, heat curing is effected by exposing the coated surface to elevated temperatures, such as those provided by radiative heat sources. Such technology may include moving (or forced) air drying such as drying by fans, blow drying, etc., or the application of heat (such as by radiative heat sources, such as drying in ovens, etc.), or both moving or forced air drying and the application of heat (such as heated blow drying). Alternatively, the water content of the film can be achieved by reducing the vapor pressure above the film using vacuum methods.

It has been found that reducing the water content of the hard surface coating composition can greatly increase the durability of the hard surface coating. In certain embodiments, it may be desirable for the water content to be less than or equal to, or less than, about 4% (or any whole number, decimal, or number containing a fraction which is less than 4, all of which numbers are incorporated herein). The amount of increase in the durability of the hard surface coating composition can, in fact, be quite unexpectedly high.

For instance, in some embodiments, it has been found that when the hard surface coating composition is applied to a hard surface and air dried at ambient temperature, the hard surface coating is able to provide the benefits described herein (or at least some of such benefits) after it has been subjected to one or two routines/cycles of the mechanical Scrub Method described in the Test Methods section below. This is believed to translate into about two to four weeks of surface protection and modification in an outside environment, including washing the surface about once a week.

However, if the hard surface coating composition is heat dried above ambient temperature (which may be about 20–22° C. in the case of a moderate outside temperature, or interior air temperature in a building), the hard surface coating formed on the surface has been found to have increased durability, so that it provides more lasting benefits. The term "long lasting", as used herein, refers to a coating that is able to provide at least some of the benefits described herein after more than one cycle of the Scrub Method described in the Test Methods section. The hard surface coating composition can be heat dried at any air temperature of greater than or equal to about 50° C. and any five degree increment above 50° C. (e.g., 55° C., 80° C., 100° C., 120° C., etc.; all temperatures in five degree increments are incorporated herein) to provide long lasting benefits. However, this could be influenced by accelerants, i.e., solvents and cross-linking agents. The hard surface coating composition can be dried for any suitable amount of time greater than or equal to a flash, or greater than, 1 minute, or any number of minutes greater than 1 minute (including, but not limited to 5 minutes and 10 minutes). The hard surface coating composition can be air dried at temperatures that approach, but preferably do not exceed a temperature that would cause the hard surface being coated to be altered, such as by melting, buckling, or the like.

In one non-limiting embodiment, the hard surface coating composition can be applied to an automobile body panel, and then heat dried at an air temperature of about 145° C. to about 160° C., or any five degree increment therebetween. It has been found that a coating dried with such a heat drying process can withstand 500 or more cycles of the mechanical scrubbing test. In another non-limiting embodiment, the hard surface coating composition can be applied to an automobile body panel, and then heat dried at an air temperature of about 135° C. It has been found that a coating dried with such a heat drying process can withstand 50 or more cycles of the mechanical scrubbing test. In another non-limiting embodiment, the hard surface coating composition can be applied to automobile glass, and then heat dried at an air temperature of about 135° C. It has been found that a coating dried with such a heat drying process can withstand 50 or more cycles of the mechanical scrubbing test.

The dried hard surface coating is preferably substantially hydrophilic. The dried hard surface, in some embodiments may have a contact angle with water of: less than or equal to about 60; or alternatively, less than or equal to about any increment of five less than 60 (e.g., less than or equal to about 50, 45, 40, . . . , 20, . . . , 10, etc.), all of which numbers are incorporated herein. In some embodiments, higher temperatures of application or drying result in higher initial contact angles, and lower temperatures of application or drying result in lower initial contact angles. However, the contact angle can change over the duration of the coating. The visual appearance of the dried hard surface coating after wetting, in some embodiments, can be improved after the surface is first hydrated for 500 seconds. The visual improvement is characterized as improved sheeting or improved curtaining of water on the surface coating.

Figure 4:
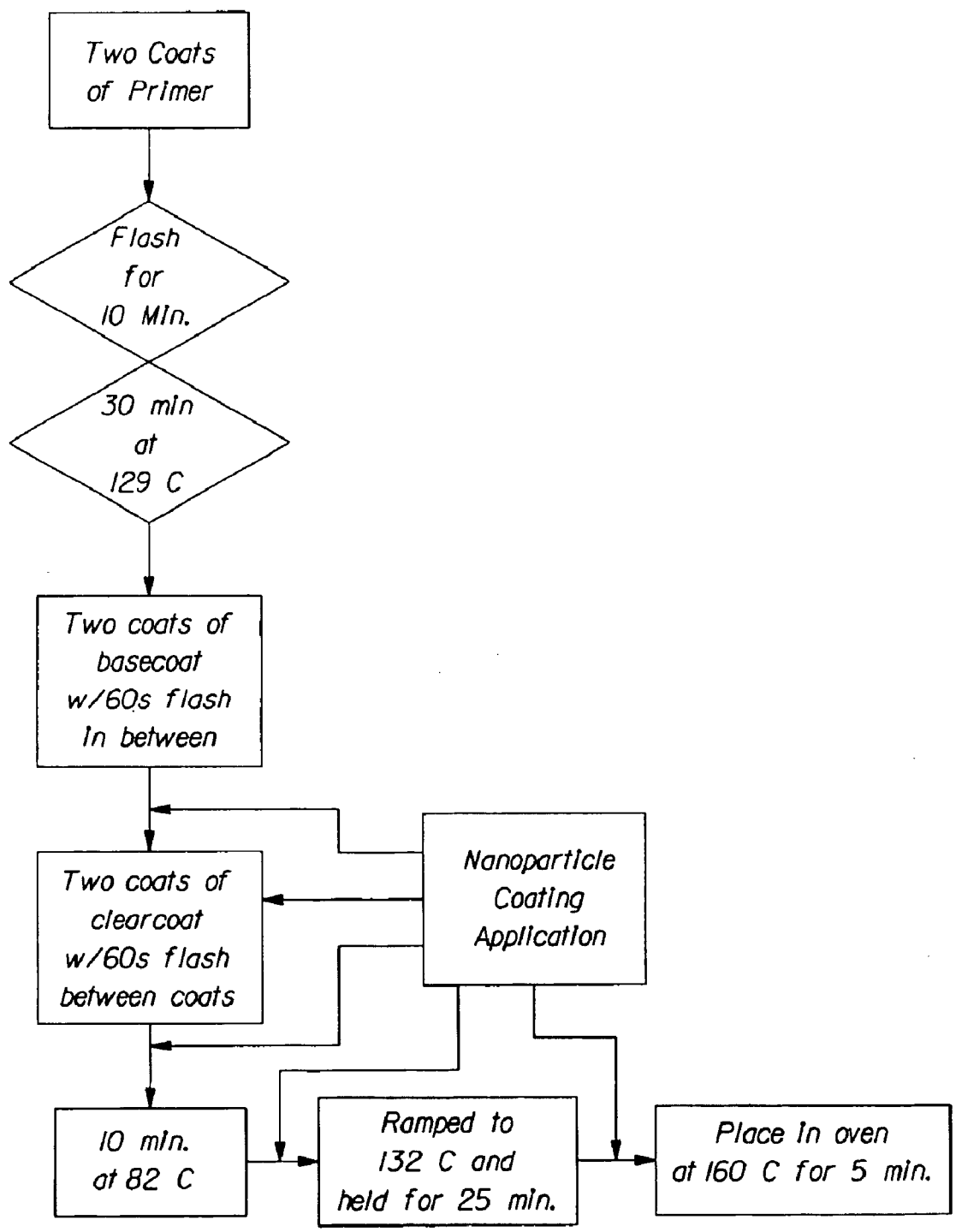
FIG. 4 is a flow diagram showing the steps in one embodiment of a clear coat application process for use in the automotive industry.
Figure 5:
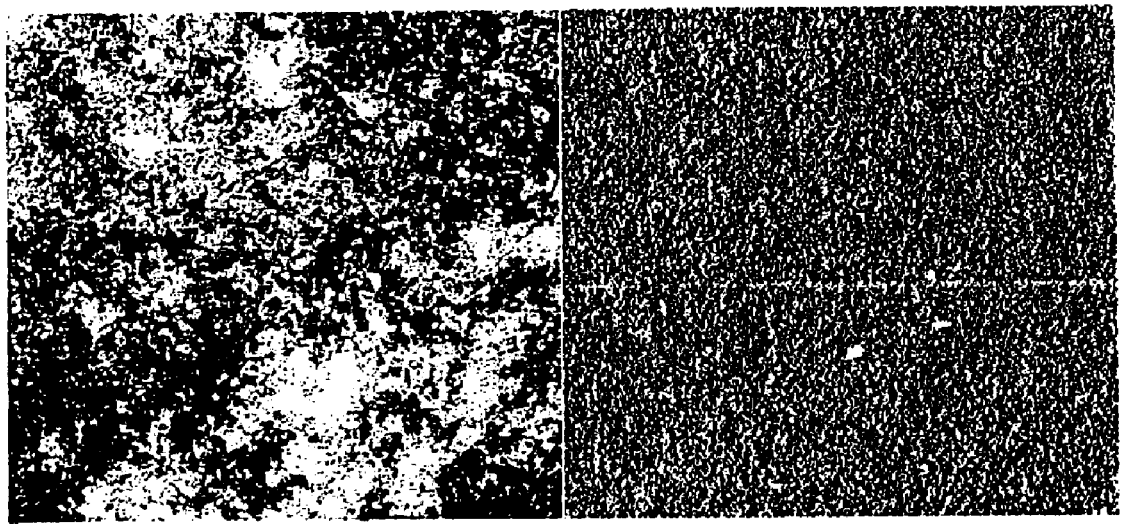
FIG. 5 is a photograph taken by atomic force microscopy of a non-limiting example of a nanoparticle coating which provides effective hydrophilic modification of a surface wherein the image on the left side represents the topography of the treated sample, and the image on the right side represents the phase of the treated sample.
Figure 6:
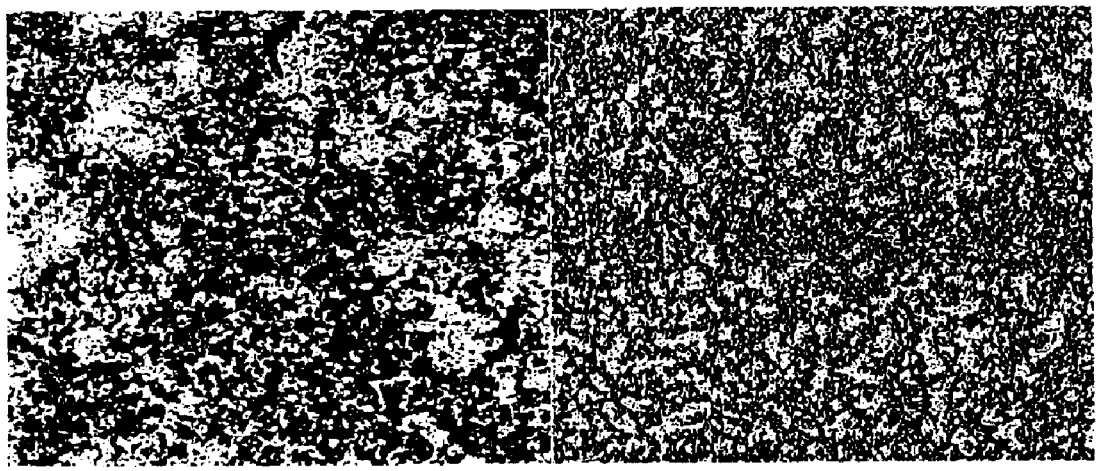
FIG. 6 is a photograph taken by atomic force microscopy of a non-limiting example of a nanoparticle coating which provides considerably less effective hydrophilic modification of a surface wherein the image on the left side represents the topography of the treated sample, and the image on the right side represents the phase of the treated sample.

In one aspect, the method of the present invention can be used in an automobile manufacturing and/or painting operation to provide a durable finish on the exterior of an automobile. FIG. 4 is a flow chart which shows one non-limiting example of the steps in painting and applying a clear coat finish to the exterior body panels of an automobile. One clear coat composition comprises a polyurethane produced from polymerization of carbamate and melamin composition, such as that available under the tradename URECLEAR® from BASF, Southfield, Mich., USA.

In the example shown in FIG. 4, the first step in painting the automobile body panels is the application of two coats of primer without flash time (elapsed time for organic solvent evaporation) between coats. Following this, the primer is flashed (dried at lower temperatures at first to drive off much of the solvent(s), then heated to a higher temperature to cure the same; this prevents bubbling) for 10 minutes. The panels are then baked at 129° C. for 30 minutes. After this, two coats of basecoat (paint) are applied with a 60 second flash in between coats. Then, two coats of clear coat are applied with a 60 second flash in between coats. The panels are then heated for 10 minutes at 82° C. This heating process is ramped up to 132° C., and held at that temperature for 25 minutes. The final step is to place the panels in an oven at 160° C. for five minutes. Of course, in other processes the temperatures and times can be varied in any suitable manner. For example, a process used by ACT Laboratories, Inc. (Hillsdale, Mich., USA) that is used in the automotive industry to test automobile body panels is described in the Test Methods section.

As shown in FIG. 4, the hard surface coating composition described herein can be applied at many different steps in the process of applying the clear coat finish to the automobile body panels. The hard surface coating composition described herein can be applied after said one or more coats of paint are applied to said automobile body parts; during the step of applying one or more coats of clear coat to said automobile body parts; or, after said one or more coats of clear coat are applied to said automobile body parts.

In other embodiments, it may be desired to use nanoparticles in the form of a powder. The nanoparticles can be used alone, or they can be combined with some other substance to form a composition. The clear coat composition, in such embodiments can be provided in any suitable form, including, but not limited to liquids, and powders. In embodiments in which it is desired to use a powder hard surface coating comprising nanoclay with a powder clear coat, it may be desirable to modify the application procedure. The application procedure can be modified in many different ways. In any embodiments desired, the surface onto which the powder coating is to be deposited can also be charged to facilitate attraction and adherence of the nanoparticles thereto.

For instance, the clear coat powder composition can first be applied by electrostatic deposition techniques or fluidized bed techniques or other such techniques that are commonly practiced, followed by application of the nanoclay coating composition by electrostatic deposition or fluidized bed or other such techniques that are commonly practiced. The surface can then be heated to provide adequate curing.

In another embodiment, the clear coat powder composition can first be coated with the powdered hard surface coating comprising nanoclay. This can be followed by application of the clear coat powder composition coated with the powder hard surface coating comprising nanoclay to the desired surface by electrostatic deposition techniques or fluidized bed techniques or other such techniques that are commonly practiced. The surface can then be heated to provide adequate curing.

In another embodiments, the clear coat powder composition and the powder hard surface coating comprising nanoclay can be applied simultaneously to the desired surface by electrostatic deposition techniques or fluidized bed techniques or other such techniques that are commonly practiced. The surface can then be heated to provide adequate curing.

In other embodiments, such as in the auto body repair business, where in some cases it is not possible to heat the body panels to the temperatures described in the preceding paragraphs without damaging other portions of the automobile, the hard surface coating composition can be applied at much lower temperatures, such as temperatures above 60° C. (the temperature the surface of a car can reach on a hot day). In such embodiments, accelerants can be used, if desired.

In embodiments in which it is desired to use an aqueous hard surface coating composition comprising nanoclay with an organic clearcoat, it may be desirable to modify the application procedure. For instance, the clearcoat composition could first be applied, and then a "skim" or film could be formed on the top of the wet clear coat using techniques known to those of skill in the art (clearcoat compositions generally dry from the top portion thereof to the bottom, and become slightly tacky when drying). The hard surface coating composition could be placed on top of the skim, and then the clearcoat with the hard surface coating composition thereon could be heated together.

In any of the embodiments described in this specification, multiple layers of the hard surface coating composition can be applied to any of the hard surfaces described herein. These multiple layers of hard surface coating composition can all have the same chemical composition, or they can have different chemical compositions.

In addition to applying the hard surface coating composition described herein to automotive body panels, the hard surface coating composition can be applied to glass, plastic, or rubber. The hard surface coating composition can, for example, be applied to automotive window glass. The hard surface coating composition can be applied to automotive window glass at any stage in the manufacture of the window glass, or in the manufacture of the automobile.

In other embodiments, the method of applying the hard surface coating composition described herein can be applied to the components of aircraft, water craft, buildings, etc. to provide a more durable surface coating.

The present invention also comprises a method of using concentrated liquid or solid coating compositions, which are diluted to form compositions with the usage concentrations, as given hereinabove, for use in the "usage conditions". Concentrated compositions comprise a higher level of nanoparticle concentration, typically from about 0.1% to about 50%, alternatively from about 0.5% to about 40%, alternatively from about 1% to about 30%, by weight of the concentrated coating composition. Concentrated compositions are used in order to provide a less expensive product. The concentrated product is alternatively diluted with 1,000 parts suitable carrier medium, alternatively 100 parts suitable carrier medium, and alternatively 10 parts suitable carrier medium of the coating composition.

In another embodiment of the present invention there is a provided a method of using a liquid, coating composition comprising (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally an effective amount of photoactive nanoparticles; (e) optionally one or more adjunct ingredients; and (f) a suitable carrier medium, alternatively concentrated liquid, for treating dishware in the rinse step of an automatic dishwashing machine. The rinse water should contain typically from about 0.0005% to about 1%, alternatively from about 0.0008% to about 0.1%, alternatively from about 0.001% to about 0.02% of the nanoparticle.

Another alternative method comprises the treatment of dishware with a coating composition dispensed from a sprayer at the beginning and/or during the drying cycle. It is preferable that the treatment is performed in accordance with the instructions for use, to ensure that the consumer knows what benefits can be achieved, and how best to obtain these benefits.

Another alternative method comprises stripping at least one layer of nanoparticles from the transparent coating on a treated hard surface using mechanical or chemical means to remove the layer of foreign matter (i.e. soil, spotting residues, food etc.) in accordance with the instructions for use to impart the benefits desired, wherein mechanical or chemical means does not exclude the weathering or optionally the normal use of the surface. Not to be limited by theory, the strippable-film mechanism of this method is depicted in FIGS. 1–3.

Figure 2:
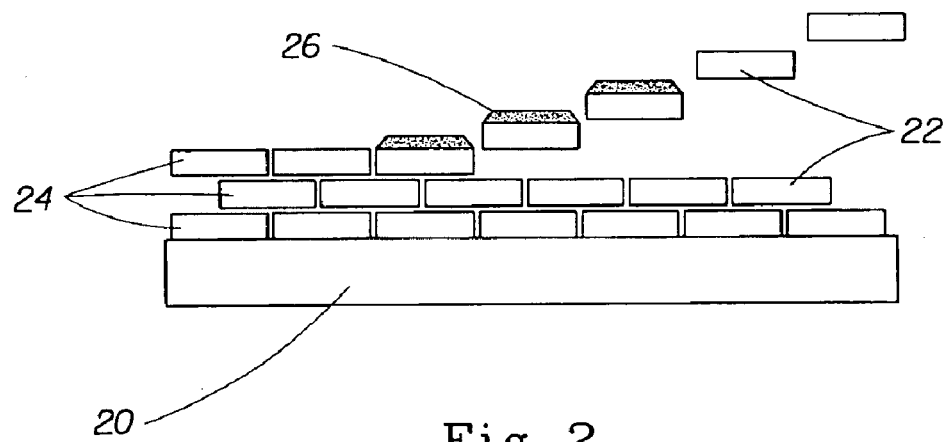
FIG. 2 is a schematic side view similar to FIG. 1, only showing how the removal of the top layer of nanoparticles may remove the soil deposited on the coating.
Figure 3:
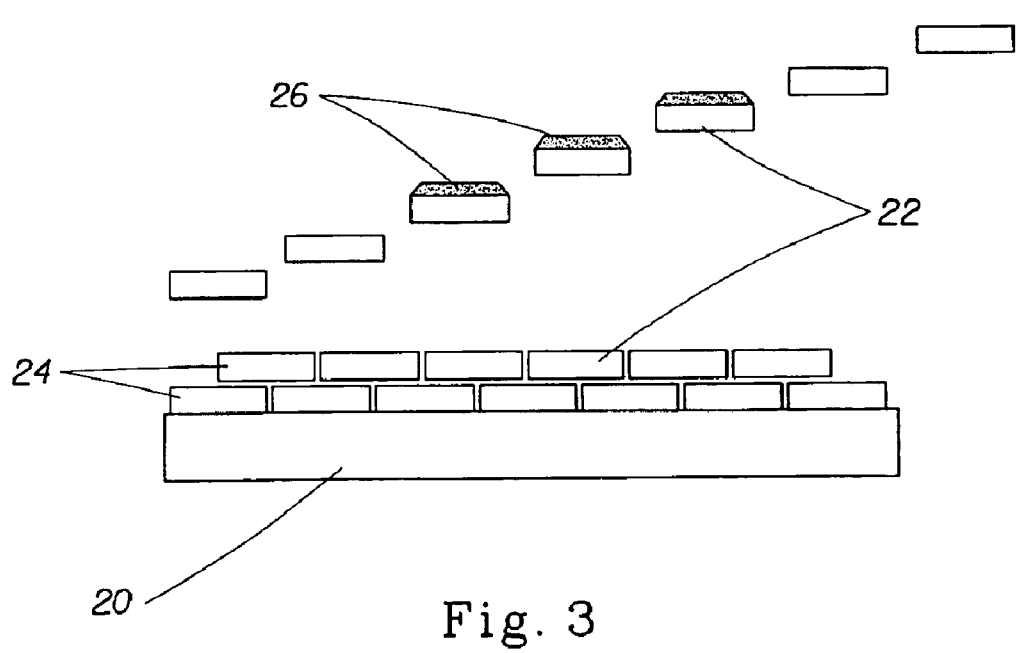
FIG. 3 is a schematic side view similar to FIGS. 1 and 2 showing a further step in the removal process.

In FIGS. 1–3, the hard surface is designated by reference number 20. The individual nanoparticles are designated by reference number 22, and the layers formed thereby are designated by reference number 24. The soil deposited on the nanoparticles is designated by reference number 26. In one embodiment of the present invention, such as an automotive, exterior building or dishware surface application, an effective nanoparticle coating is deposited as an invisible film, preventing soil 26 from adhering to the hard surface 20 (FIG. 1). The nanoparticle coating consists of multiple effective layers 24 of nanoparticle sheets that provide the benefit. During the weathering, washing or stripping treatment process, at least one top layer 24 of the nanoparticle coating is removed, taking the soil 26 along with it (FIGS. 2 and 3).

III. Articles of Manufacture

The present invention also relates to an article of manufacture comprising the hard surface coating composition in a package, in association with instructions for how to use the coating composition to treat hard surfaces correctly, in order to obtain any of the desired results described herein. An alternative article of manufacture comprises said composition in a spray dispenser, in association with instructions for how to use the coating composition to treat hard surfaces correctly, including, e.g., the manner and/or amount of composition to spray, and the alternative ways of applying the coating composition. It is important that the instructions be as simple and clear as possible, so that using pictures and/or icons is desirable.

Spray Dispenser

The coating composition may be placed into a spray dispenser in order to be distributed onto the hard surface. The spray dispenser can be any of the manually activated types for applying the coating composition to small hard surface areas and/or a small number of substrates, as well as non-manually operated, powered sprayers for conveniently applying the coating composition to large hard surface areas and/or a large number of substrates. The spray dispenser can include, but are not limited to any of the following: aerosol spray dispensers, self-pressurized spray dispensers, non-aerosol, manually activated, pump-spray dispensers, manually-activated trigger-spray dispensers, trigger sprayers or finger pump sprayers, non-manually operated spray dispensers including, but not limited to, powered sprayers, air aspirated sprayers, liquid aspirated sprayers, electrostatic sprayers, and nebulizer sprayers. Powered sprayers can include, but are not limited to, centrifugal or positive displacement designs. Powered sprayers are readily available from suppliers such as Solo, Newport News, Virginia (e.g., Solo Spraystar™ rechargeable sprayer, listed as manual part #: US 460 395). Certain types of sprayers, including, but not limited to electrostatic sprayers, may cause fewer suds or bubbles to be introduced into the treating composition during application to the surface, which form suitable coatings with less visible residue under a wider variety of conditions. This may allow a wider range of surfactants to be used in the coating composition.

It is preferred that the powered sprayer be powered by a portable DC electrical current from either disposable batteries (such as commercially available alkaline batteries) or rechargeable battery units (such as commercially available nickel cadmium battery units). Powered sprayers can also be powered by standard AC power supply available in most buildings. The discharge nozzle design can be varied to create specific spray characteristics (such as spray diameter and particle size). It is also possible to have multiple spray nozzles for different spray characteristics. The nozzle may or may not contain an adjustable nozzle shroud that would allow the spray characteristics to be altered.

Electrostatic sprayers impart energy to the aqueous coating composition via a high electrical potential. This energy serves to atomize and charge the aqueous coating composition, creating a spray of fine, charged particles. As the charged particles are carried away from the sprayer, their common charge causes them to repel one another. This has two effects before the spray reaches the target. First, it expands the total spray mist. This is especially important when spraying to fairly distant, large areas. The second effect is maintenance of original particle size. Because the particles repel one another, they resist collecting together into large, heavier particles like uncharged particles do. This lessens gravity's influence, and increases the charged particle reaching the target. As the mass of negatively charged particles approach the target, they push electrons inside the target inwardly, leaving all the exposed surfaces of the target with a temporary positive charge. The resulting attraction between the particles and the target overrides the influences of gravity and inertia. As each particle deposits on the target, that spot on the target becomes neutralized and no longer attractive. Therefore, the next free particle is attracted to the spot immediately adjacent and the sequence continues until the entire surface of the target is covered. Hence, charged particles improve distribution and reduce drippage.

Nonlimiting examples of commercially available electrostatic sprayers appears in U.S. Pat. No. 5,222,664, Noakes, issued Jun. 29, 1993; U.S. Pat. No. 4,962,885, Coffee, issued Oct. 16, 1990; U.S. Pat. No. 2,695,002, Miller, issued Nov. 1954; U.S. Pat. No. 5,405,090, Greene, issued Apr. 11, 1995; U.S. Pat. No. 4,52,034, Kuhn, issued Jun. 21, 1988; U.S. Pat. No. 2,989,241, Badger, issued Jun. 1961. Electrostatic sprayers are readily available from suppliers such as Tae In Tech Co, South Korea and Spectrum, Houston, Tex.

The article of manufacture may comprise a combination of a non-manually operated sprayer and a separate container of the aqueous coating composition, to be added to the sprayer before use and/or to be separated for filling/refilling. The separate container can contain a usage composition, or a concentrated composition to be diluted before use, and/or to be used with a diluting sprayer, such as with a liquid aspirated sprayer, as described above.

The separate container may have structure that mates with the rest of the sprayer to ensure a solid fit without leakage, even after motion, impact, etc. and when handled by inexperienced consumers. The sprayer desirably can also have an attachment system that is safe and alternatively designed to allow for the liquid container to be replaced by another container that is filled. For example, a filled container can replace the fluid reservoir. This can minimize problems with filling, including minimizing leakage, if the proper mating and sealing means are present on both the sprayer and the container. Desirably, the sprayer can contain a shroud to ensure proper alignment and/or to permit the use of thinner walls on the replacement container. This minimizes the amount of material to be recycled and/or discarded. The package sealing or mating system can be a threaded closure (sprayer) which replaces the existing closure on the filled and threaded container. A gasket is desirably added to provide additional seal security and minimize leakage. The gasket can be broken by action of the sprayer closure. These threaded sealing systems can be based on industry standards. However, it is highly desirable to use a threaded sealing system that has non-standard dimensions to ensure that the proper sprayer/bottle combination is always used. This helps prevent the use of fluids that are toxic, which could then be dispensed when the sprayer is used for its intended purpose.

An alternative sealing system can be based on one or more interlocking lugs and channels. Such systems are commonly referred to as "bayonet" systems. Such systems can be made in a variety of configurations, thus better ensuring that the proper replacement fluid is used. For convenience, the locking system can also be one that enables the provision of a "child-proof" cap on the refill bottle. This "lock-and-key" type of system thus provides highly desirable safety features. There are a variety of ways to design such lock and key sealing systems.

Care must be taken, however, to prevent the system from making the filling and sealing operation too difficult. If desired, the lock and key can be integral to the sealing mechanism. However, for the purpose of ensuring that the correct recharge or refill is used, the interlocking pieces can be separate from the sealing system. E.g., the shroud and the container could be designed for compatibility. In this way, the unique design of the container alone could provide the requisite assurance that the proper recharge/refill is used.

The present invention also relates to an article of manufacture comprising a coating composition for use in spraying and/or misting an entire hard surface or article in a manner such that excessive amounts of the coating composition are prevented from being released to the open environment, provided in association with instructions for use to ensure that the consumer applies at least an effective amount of nanoparticle system and/or coating composition, to provide the desired hard surface multi-use benefit.

Other coating compositions of the present invention for use to treat hard surfaces, such as dishware, in different steps of the automatic dishwashing process, e.g., pre-wash, wash cycle, rinse cycle, and drying cycle, can be packaged in association with instructions for how to use the coating composition to treat dishware correctly, in order to obtain the desired results.

Product with Instructions for Use

The present invention also encompasses the inclusion of instructions on the use of the coating compositions of the present invention with the packages containing the coating compositions herein or with other forms of advertising associated with the sale or use of the coating compositions. The instructions may be included in any manner typically used by consumer product manufacturing or supply companies. Examples include providing instructions on a label attached to the container holding the coating composition; on a sheet either attached to the container or accompanying it when purchased; or in advertisements, demonstrations, and/or other written or oral instructions which may be connected to the purchase or use of the coating compositions, including, but not limited to videotapes and computer disks of any type.

Specifically the instructions will include a description of the use of the coating composition, for instance, the recommended amount of composition to use in order to coat the hard surface or article the recommended amount of composition to apply to the hard surface; if spraying, soaking or rubbing is appropriate. The instructions may provide that the user is to allow the coating composition to dry without rinsing or agitating the same.

The compositions and methods of the present invention can be used for domestic modification of hard surfaces, or for industrial modification of hard surfaces, such as in automotive and building component manufacturing.

EXAMPLE(S)

The following examples are illustrative of the present invention, but are not meant to limit or otherwise define its scope. All parts, percentages and ratios used herein are expressed as percent weight unless otherwise specified.

Examples 1–18

Liquid coating compositions, according to the present invention, are as follows where the balance is purified water:

TABLE 1

| Example # | Nanoparticle (Wt %) | Surfactant (Wt %) |
|---|---|---|
| 1 | Nanoclay (0.1) | Neodol 91-6 (0.075) |
| 2 | Nanoclay (0.05) | Neodol 91-6 (0.075) |
| 3 | Nanoclay (0.05) | Silwet L-77 (0.025) |
| 4 | Nanoclay (0.1) | Q2-5211 (0.025) |
| 5 | Nanoclay (0.05) | Q2-5211 (0.025) |
| 6 | Nanoclay (0.03) | Q2-5211 (0.1) |
| 7 | Nanoclay (0.1) | Tergitol 15-S-9 (0.1) |
| 8 | Nanoclay (0.1) | Tergitol NP-9 (0.1) |
| 9 | Nanoclay (0.1) | Neodol 91-8 (0.075) |
| 10 | Nanoclay (0.1) | Component A$^2$ (0.2) |
| 11 | Nanoclay (0.2) | Component A (0.2) |
| 12 | Nanoclay (0.1) | Component B$^3$ (0.2) |
| 13 | Nanoclay (0.1)$^4$ | Neodol 91-6 (0.075) |
| 14 | Disperal P2 ™ (0.1)$^5$ | Neodol 91-6 (0.075) |
| 15 | Nanoclay (0.1) | APG$^6$ (0.05) |
| 16 | Nanoclay (0.1) | Butyl capped poly(oxyalkylated) alcohol (0.075) |
| 17 | Nanoclay (0.1) | Ether capped poly(oxyalkylated) alcohol (0.075) |
| 18 | Nanoclay (0.1) | Minfoam 1x (0.06) Minfoam 2x (0.015) |

$^1$Nanoclay can be any of the available synthetic hectorite clays, such as LAPONITE ™ available from Southern Clay Products, Inc. One preferred grade of LAPONITE ™ is LAPONITE B ™, a sodium magnesium lithium fluorosilicate.
$^2$Component A is R8-C(O)N(CH3)—(CH2CH2O)sB, where R8 is a 6 to 20 carbon atom alkyl group, s is an integer from 2 to 45, and B is hydrogen.
$^3$Component B is RN(CH3)2(CH2CH2O)sB, where R is a 6 to 20 carbon atom alkyl group, s is an integer from 2 to 45, and B is SO3—.
$^4$One preferred grade of LAPONITE ™ for this example is LAPONITE RD ™.
$^5$Disperal P2 ™ is boehmite alumina from Condea, Inc.
$^6$APG is alkly-polyglucoside.

Examples 19–22

In the following examples, dispersants are formulated with the nanoclay and surfactant to allow the hard surface coating composition to be made with tap water:

TABLE 2

| Example # | Nanoparticle (Wt %) | Surfactant (Wt %) | Dispersant (Wt %) |
|---|---|---|---|
| 19 | Nanoclay (0.1) | Neodol 91-6 (0.075) | Polyacrylate 4500 MW (0.02) |
| 20 | Nanoclay (0.1) | Neodol 91-6 (0.075) | Poly (acrylic/maleic)[2] (0.02) |
| 21 | Nanoclay (0.1) | Neodol 91-6 (0.075) | Polyacrylate 2000 MW (0.02) |
| 22 | Nanoclay (0.1) | Neodol 91-6 (0.075) | STPP (0.02) |

[1]Nanoclay can be any of the available synthetic hectorite clays, such as LAPONITE B ™ from Southern Clay Products, Inc.
[2]MA:AA (maleic acid:acrylic acid) = 4:6, MW (molecular weight) = 11,000.

Examples 23–30

Liquid coating compositions, according to the present invention, where the balance is water, and where said coating composition can be applied to a surface, or optionally where the coating composition can be diluted with water to achieve a coating composition with 0.1% concentration of nanoparticles are as follows:

TABLE 3

| Example # | Nanoparticle (Wt %) | Surfactant (Wt %) | Dispersant (Wt %) |
|---|---|---|---|
| 23 | Nanoclay (1.6) | Q2-5211 (0.8) | None |
| 24 | Nanoclay (0.8) | Q2-5211 (0.4) | None |
| 25 | Nanoclay (0.8) | Neodol 91-6 (0.6) | None |
| 26 | Disperal P2 ™ (10) | Neodol 91-6 (7.5) | None |
| 27 | Nanoclay (5.0) | Neodol 91-6 (3.75) | Polyacrylate 4500 MW (1.0) |
| 28 | Nanoclay (5.0) | Neodol 91-6 (3.75) | Poly (acrylic/maleic)[3] (1.0) |
| 29 | Nanoclay (1.0) | Neodol 91-6 (0.75) | Polyacrylate 4500 MW (0.2) |
| 30 | Nanoclay (1.0) | Neodol 91-6 (0.75) | Polyacrylate 4500 MW (0.1) |

[1]Nanoclay can be any of the available synthetic hectorite clays, such as LAPONITE ™ available from Southern Clay Products, Inc.
[2]Disperal P2 ™ is boehmite alumina from Condea, Inc.
[3]MA:AA = 4:6, MW = 11,000.

The following examples 31 and 32 are compositions that can be actively cured to increase the durability of the hard surface coating. (It is, of course, also possible to actively cure compositions in the other examples provided herein.)

Example 31

A composition comprising 68 grams of URECLEAR® clearcoat obtained from BASF Corporation of Southfield, Mich., USA is combined with 0.1 to 25 grams of a nanoclay, such as LAPONITE™, a synthetic hectorite clay obtained from Southern Clay Products, Inc. of Gonzales, Tex., USA. These two components are mixed under agitation, and 15 grams of methyl isoamylketone methyl-2-hexanone is added.

The clearcoat composition is sprayed wet-on-wet over a high solids basecoat onto electocoated primed automotive body panels. The panels are flashed at ambient temperatures for 10 minutes and then cured for 20 minutes at 270° F. (132.20° C.).

Example 32

Automotive body panels are treated with 0.1% nanoclay/0.075% Neodol 91-6 surfactant using a Solo sprayer and air-dried vertically. Several panels are used and are cured at different temperatures. Panels are heated in an oven at the temperatures specified in Table 1 for 25 min., and then allowed to cool. Post-heat performance is assessed, panels are scrubbed (Sheen Wet Abrasion Scrub Tester, 500 g total wt., sponges saturated with dilute DAWN® dishwashing liquid solution), and performance is reassessed. Contact angle measurements are taken before heating, after heating, and after scrubbing. A Miniscan XE with C/2° illuminant (Hunter Associates Laboratory, Inc., Reston, Va., USA) is used to measure panel color (CIE L*a*b* color scale) after heating. Some panels are treated with thionin cationic dye (500 ppm) to visually assess the coating composition's longevity.

Results

Table 4. Heating Profile—Performance and Removability[a]

TABLE 4

Heating Profile - Performance and Removability [a]

| Temperature (° C.) | | Performance After Heating (25 min.) | Sheeting/Curtaining Lasts Through (0, 10, 50, 100, 500 scrubs) |
|---|---|---|---|
| 22 | Ambient | Sheeting | <10 scrubs |
| 60 | Baking temp used in aftermarket coating applications | Sheeting | <10 scrubs |
| 80–110 | Low end baking temp used by Original equipment manufacturers (OEM's) (80° C.) | Curtaining | <50 scrubs |
| 135 | | Curtaining | <100 scrubs |
| 148 | | Curtaining | 500 scrubs |
| 160 | High end baking temp used by OEM's | Curtaining | 500 scrubs |

[a] black panels, cured 3 days

Examples 33–35

Granular, hard surface coating compositions, according to the present invention, which can be placed into the rinse aid cup of a dishwasher and dispensed through the rinse cycle for improved spotting filming benefits on dishware surfaces are as follows:

| | | % by weight | |
|---|---|---|---|
| Component | 33 | 34 | 35 |
| 1. Plurafac RA30 | 35 | — | — |
| 2. Citric Acid | 3 | — | — |
| 3. Acusol 480 | 8 | — | — |
| 4. Naxonate 45SC | 9 | — | — |
| 5. DTPMP | 0.05 | — | — |
| 6. Nanoclay | 0.005–2 | 0.005–2 | 0.005–2 |
| 7. Ether capped poly(oxyalkylated) alcohol | — | — | 0.01–1 |
| 8. Ethanol | 7 | — | — |
| 9. Perfume | 0.1 | — | — |
| 10. Dye | 0.3 | — | — |
| 11. Water | Balance | Balance | Balance |

1. Plurafac RA ™ is a surfactant from BASF.
2. Citric Acid used for pH control.
3. Acusol 480 ™ is a Rhom and Haas polymer.
4. Naxonate 45SC ™ is a hydrotrope for better formulatability.
5. DTPMP is a sequestering agent.
6. Nanoclay can be LAPONITE RD ™ or B ™ from Southern Clay Products.
7. Ether capped poly(oxyalkylated) alcohol acts as a nonionic wetting agent.
8. Ethanol is used for viscosity control.
9. Perfume and Dyes are optional.

Examples 36 and 37

In addition to the above Examples, liquid hard surface coating compositions which can be placed in a spray bottled and delivered as a spray-on formula for improved tough food soil release benefits on hard surfaces are as follows:

TABLE 5

| | % by weight | |
|---|---|---|
| Component | 36 | 37 |
| 1. Nanoclay | 0.005–2 | 0.005–2 |
| 2. Ether capped poly(oxyalkylated) alcohol | — | 0.01–1 |
| 3. Water | Balance | Balance |

1. Nanoclay can be any of the available synthetic hectorite clays, such as LAPONITE RD ™ or B ™ from Southern Clay Products, Inc.
2. Ether capped poly (oxyalkylated) alcohol acts as a nonionic wetting agent.
3. Water is used for balance.

The above coating compositions when applied to a hard surface, modify the hard surface to exhibit at least one of the following multi-use benefits consisting of improved hard surface: wetting and sheeting, quick drying, uniform drying, soil removal, self-cleaning, anti-spotting, anti-soil deposition, cleaner appearance, enhanced gloss, enhanced color, minor surface defect repair, smoothness, anti-hazing, modification of surface friction, release of actives, reduced damage to abrasion and transparency; as compared to a hard surface not treated with said hard surface coating composition.

In certain aspects, the hard surface coating has a transmittance to light of greater than or equal to about 75% measured according to the Transmittance Test. That is, in such an aspect, at least 75% of the incident light is transmitted through the hard surface coating, and 25% of the incident light will not be transmitted through the hard surface coating. In another aspect, the hard surface coating has a transparency such that the surface coated with the hard surface coating appears to the unaided human eye to be substantially unaltered in comparison to a surface that has not been coated with the hard surface coating.

It is also possible that the coatings described herein could potentially provide other benefits. It is believed, subject to confirmation, that the coatings described herein could potentially be useful in reducing drag on moving articles such as skis, and moving vehicles, such as automobiles, aircraft, watercraft, and the like, and in preventing the buildup of material on hard surfaces, such as preventing the buildup of ice on airplane wings and preventing the buildup of deposits such as scale on the inside of pipes in order to facilitate transport of fluids. One non-limiting example of a preventative purpose for the coating would be to utilize the coating composition in the nature of a drain cleaner. Such a composition can be poured into drain pipes to prevent the build up, or further build up, of deposits in the pipes.

In the case of any of the embodiments described in this detailed description, unless specified otherwise, the coating can be applied to the hard surface with or without the active curing step. It is understood that the active curing step is useful because it is believed to provide the coating with additional durability. The coatings described herein can be applied at any suitable time in the life of the hard surface including during or after manufacture of the hard surface, if it is a type of hard surface that is manufactured. The coating can also be applied during the life of the hard surface for protective purposes, preventative purposes, or any other purposes.

Test Methods

Unless otherwise stated, all tests are performed under standard laboratory conditions (50% humidity and at 73° F. (23° C.)).

Procedure for Measurement of Durability of Coating

Procedure:

1. Clean surface: 4"×12" auto panels are used as received with desired coating applied. If X-ray fluorescence (XRF) analysis is performed, panels are cut into 1"×1.5" (2.5×3.8 cm) rectangles, and cleaned by an ethanol rinse, followed by washing with DAWN® dishwashing liquid available from The Procter & Gamble Company of Cincinnati, Ohio, USA wash and deionized water rinse prior to use in the scrub test.
2. Apply product with hand pump sprayer until auto panel is completely wet, allow to air dry (2 hr. minimum).
3. Heat in oven for 25 min. (at desired temperature, e.g., one of the temperatures listed in Table 4), allow to cool to room temperature.
4. Measure contact angle.
5. Assess visual performance.
6. Perform scrub test.
7. Assess visual performance.
8. Measure contact angle once panel has dried.
9. Perform dye or XRF analysis.

Auto Panel Specifications:

Test panels, primer and basecoat compositions are obtained from ACT Laboratories, Inc. (Hillsdale, Mich., USA). Their preparation method is as follows. The primer is sprayed on in two coats with no flash time between coats. Primer then flashes for 10 min. Substrates are baked in an oven for 30 min. at 265° F. (129° C.) (this temperature is the substrate, or panel, temperature). Film build range=0.9–1.1 mils (22.9 to 27.9 μm). Once the primer has cooled, the basecoat is applied in two coats with 60 sec. flash between coats, for a film build of 0.6–0.8 mils (15.2 to 20.3 μm). Basecoat is flashed for 2 min. before the URECLEAR® clearcoat is applied in two coats with 60 sec. flash between coats, to a film build of 1.9–2.1 mils (48.3 to 53.3 μm). The hard surface coating can be applied to the panels at any stage of the process as shown in FIG. 4. The panels are then flashed 20 min. prior to final oven bake: 10 min. at 180° F. (82° C.), then temperature is ramped up to 270° F. (132° C.) for 25 min. (substrate temperature).

Visual Performance Assessment

The substrate is rinsed with water, while the panel is held at a 90° angle to horizontal, and the panel is judged to determine whether it exhibits sheeting, curtaining, or beading. "Sheeting" is when an even film of water covers the substrate, and slowly dries down without developing breaks in the film. "Curtaining" occurs when the water slowly pulls into the middle and drains off the substrate. Performance is judged to be "beading" when the water shows no affinity for the surface, and quickly runs off the substrate.

Scrub Method for Measurement of Durability

Sheen Wet Abrasion Scrub Tester (Model 903PG, Sheen Instruments Ltd., Kingston, England) is fitted with 4-3.25"×1.5"×1.75" (8.25 cm×3.8 cm×4.4 cm) sponges saturated with 30 mL of 0.2% DAWN® dishwashing liquid in deionized water with 10 grains per gallon added hardness (3:1 molar ratio $Ca^{2+}:Mg^{2+}$). The instrument is set to 30 cycles per minute, with 200 g weights on each of the 300 g carrier arms for a total of 500 g per carrier arm. Scrub levels: 0, 10, 50, 100, 500 scrubs.

Contact Angle

Deionized water (25 μL) is pipetted onto the coated substrate, and contact angle is measured using a goniometer (NRL C.A.Model #100-00 115 from Reme-Hart Inc., Mountain Lakes, N.J., USA, with Olympus TGHM light source, Olympus Optical Co., Ltd., Japan) Three measurements are made and averaged for each sample tested.

The surfaces treated by the methods and with the compositions described herein can have a lower contact angle with water than the same surface which has not been treated as described herein.

Dye Analysis

Only white surfaces can be used for this analysis. The surface is thoroughly rinsed with a solution of thionin cationic dye (500 ppm in deionized water), followed by a rinse with water to remove excess dye. An untreated surface of the same type is used as a control. The surface coverage of the synthetic hectorite coating can be assessed qualitatively by visual evaluation or by Hunter Miniscan XE measurements.

X-Ray Fluorescence Analysis

X-Ray Fluorescence (XRF) is a nondestructive and noninvasive technique that assesses the concentration of elements in a sample or on the surface of a sample. The analysis is performed using a Phillips Analytical, 12 Michigan Dr. Natick, Mass. 01760, USA, PW2404 Sequential "4000W" X-Ray Spectrometer System, Serial No. DY735. The instrument settings and specifications for XRF analysis are set out in Table 6 below.

Measurement Procedure:
1) Calibration curves that relate instrument response to analyte concentration can be constructed by pipetting known concentrations of standards on the desired substrate. Standards are allowed to slowly dry before measurements are performed.
2) The standard or sample is assayed by placing the sample face down in a sample cup, loading the sample cup into the spectrometer, and initiating the data acquisition sequence. In the case of synthetic hectorite coatings, the element lines for Mg and Si are measured whereas the element line for Al is used for aluminum oxide coating.
3) Concentration for samples are determined from the calibration curve for standards.

TABLE 6

| General conditions used on automobile surfaces | |
| --- | --- |
| Sample Chamber Environment | Vacuum |
| Collimator mask size | 16 mm |
| Collimator size | 700 μm |
| Volatage | 32 kV |
| Current | 125 mA |
| Detector type | Goniometer |
| Analysis time | 30 sec. |
| Element line assayed | Kal for desired element |
| Sample Spinner | On |
| Tube Type | Rhodium |

Gravimetric Test for Determining Drying Time

The relative quickness of drying of a surface that has been wetted can be measured with and without treatment by the compositions disclosed herein, by simple gravimetric methods. A sample of material from which the surface is made is weighed. The sample is then wetted with water and allowed to dry. The sample with any water remaining thereon is weighed at various times throughout the drying process, and plotted in the form of a graph. When drying times are compared herein, they are compared in terms of weight of water remaining on the sample after a given time, which time used herein is ten minutes.

Procedure for Comparison of Residue Formation From Soils on Surfaces

Surfaces to which this method is applicable include, but are not limited to, painted automotive panels, ceramic tiles, and glass.

Residue solutions tested include Morton Safe-T-Salt Rock Salt, Artificial Street Dirt in the form of a product known as HSW soil available from CHEM-PACK, Cincinnati, Ohio 45214 and tap water.

Procedure:
1. Clean surface: 1½"×2½" painted automotive panels are used as received. The panels are washed with surfactant solution and rinsed with deionized water prior to use in the residue test. Bathroom tiles are cleaned by repeatedly wiping with isopropanol and rinsing with distilled water until rinse water beads or runs off tile in less than 5 seconds.
2. If gravimetric comparison of residue is to be performed, each surface (e.g. each automotive panel) is weighed before application of the residue solution (initial weight).
3. Apply nanoparticle hard surface coating product with hand pump sprayer until surface is completely wet, allow to air dry (4 hr. minimum).
4. A residue solution, which will result in residue upon drying, is applied with a hand pump sprayer until the surface is completely wet. The surface is allowed to air dry (6 hour minimum).

Analysis:
1. Visual assessment of residue formation on the surfaces is performed for example by counting the number of residue spots, grading for the amount of streaking and measurement of gloss/haze.
2. Gravimetric comparison of residue is performed where possible. Once the residue has dried completely, each surface is weighed (final weight) and the weight of the residue on the surface is determined by subtracting the initial weight of the surface from the final weight.

Results:
Residue is measured on five automotive panels for each treatment giving a Relative Standard Deviation $\leq 1.1$.

| Residue on Automotive Panels | Untreated Panel | Treated Panel |
| --- | --- | --- |
| Salt[1] (mg) | 23.7 | 3.4 |
| Street dirt[2] (mg) | 1.64 | 0.46 |
| Number of salt spots | 141 | 24 |
| Number of artificial street dirt spots | 90 | 3 |

[1]Morton Safe-T-Salt Rock salt
[2]Artificial Street Dirt as represented by HSW soil available from CHEM-PACK, Cincinnati, OH 45214

Procedure for the Measurement of Specular Gloss of Surfaces

Surfaces to which this method is applicable include painted automotive panels, ceramic tiles, vinyl siding, acrylics, and other synthetic or natural hard surfaces for indoor and outdoor applications.

Procedure:
1. Clean surface: The surface to be tested is washed with 1% DAWN® dishwashing liquid (available from The Procter & Gamble Company of Cincinnati, Ohio, U.S.A.) solution and rinsed with deionized water prior to use.
2. Calibrate a Photovolt "G-3" Gloss meter (BYK-Gardner USA, Rivers Park II, 9104 Guilford Road, Columbia, Md. 21046, USA.) according to manufacturer's instructions and measure specular gloss of the surface at 60° geometry. If the gloss value is lower than 10 (e.g., for dull or matte surfaces), the 85° geometry should be used for comparisons. If the gloss value is $\geq 10$ and <70, inclusive (medium gloss surfaces), the 60° geometry should continue to be used. If it is greater than 70 (high gloss surfaces), the 20° geometry should be used. At least 3 readings are taken for each surface type at the applicable geometry.
3. If a coated surface is available, proceed to the next step. If the surface has not been coated, apply the nanoparticle solution to the surface and allow the specimen to air dry in a horizontal position (4 hr. minimum).
4. Once the surface is dry the gloss value is measured again to determine the change in specular gloss after treatment.

Analysis:
1. Calculate the mean initial (before treatment), and final (after treatment and drying) gloss values for each surface.
2. Determine the percent change in specular gloss after treatment:

$$100 \times \frac{\Delta \text{ Gloss}}{\text{Initial Gloss}}$$

Count and Measure of Suds and Film Desirability Effect

A 4×12 in. (approximately 10×30 cm) panel of the surface in issue is washed with 0.2% DAWN® dishwashing liquid in deionized water and rinsed with deionized water and allowed to air-dry vertically. The treating composition is sprayed with a Solo Spraystar sprayer on panel at 50 angle from horizontal and from 6 inches (15 cm) away, once from top to bottom, until panel is thoroughly coated. The sprayer is rinsed with 50 mL deionized water between sprayings. A digital picture is then taken of the middle 4×4" (10.16×10.16 cm area (referred to as the 100 cm$^2$ area) after 30 seconds (timed from completion of spraying). The picture is taken with an Olympus® Camedia D-450ZOOM digital camera mounted on a support stand with a clamping arm approximately 18 in. (45.7 cm) above the panel.

Suds in the picture are counted using Media Cybernetics® ImagePro® Plus 4.0 software obtained from Media Cybernetics, Inc., 8484 Georgia Avenue, Suite 200, Silver Spring Md., 20910, USA. The software is used to calibrate the image to actual proportions by setting the number of pixels displaying the width of the panel equal to 10.16 cm. Spatial filtering tools are then used to enhance the image. Suds are then counted over the middle 4×4" area of the panel and each defect is measured according to the width of the defect. The size data is then transferred to a spreadsheet where it can be organized into size categories or bins in a histogram.

Spatial parameters of the image are set using the "Calibration" tool "Spatial" (under "Measure") by setting the width of the panel equal to 10.16 cm. An area of interest ("AOI") is then set from the "Edit" menu around the 10.16×10.16 cm area. Background noise is then removed with filters under the "Spatial Filtering" tab. Under the "Special" tab, "Sculpt" (2 passes at strength 10) filter is used to remove background lighting irregularities and "Erode" filter is used under the "Morphological" tab (2 passes of the "erode" filter at the "3×3 cross" setting) to enhance defects.

Distribution of bubble sizes is determined with the "Count and Measure Objects" feature. Under "Measurements to be Taken", "Size Width" is selected. Under "Options", "Smoothing"=100, "4 Connect", and Fill Holes are selected. Under "Count/Measure": "Automatic Dark Objects" is selected. After "Count" is performed, "Data to File" from the "File" menu is selected to transfer the defect size data into a spreadsheet.

The computer program is essentially "sieving" or categorizing the defects of various sizes. In the spreadsheet, 13 bins are created for the histogram. "Defect Size" reports center of range of each bin. Bin maximums (millimeters) are 0.1, 0.25, 0.5, 0.75, 1.0, 1.25, 1.5, 1.75, 2.0, 2.5, 5.0, 7.5, and 10.0. The center of each bin range is determined by the following:

$$\text{"Defect Size"} = \frac{\text{bin maximum} - \text{previous bin maximum}}{2} + \text{previous bin maximum}$$

The number of defects in the bins of a size greater than equal to 1.75 mm is determined.

Visual Grading Test

Six independent panelists grade the entire panel except for the lower 2 inches of the panel used in the foregoing test for visible negatives against an untreated control in a room simulating North American light at 12:00 pm (noon). Grading instructions are as follows:
Purpose: Observers are used to determine the effect of application methods on the desirability of the end result of a coated surface.
Instructions:
1. The panelists are instructed to use light to look for irregularities on panel that would draw their attention as a negative.
2. Rate desirability of panel appearance against the control (0) on the following scale:

| | |
|---|---|
| 0 = | Same |
| −1 = | Think it's slightly worse |
| −2 = | Know it's a little worse |
| −3 = | Definitely worse |
| −4 = | Much worse |

3. The panelists' gradations are then averaged.

Transmittance Test

Transmittance is measured using ASTM method D 1003-00. Transmittance is expressed as a percentage that represents the amount of incident light that passes through the article that is tested.

Viscosity Test

All measurements are performed with a Brookfield RVDV II+ rotational viscometer available from Brookfield Engineering Labs, Inc., Stoughton, Mass. USA. The recommended procedure is followed, with the following exceptions. The recommended procedure is varied by using a smaller vessel and removing the guard leg. The calibration is to be determined using a 600 ml low form griffin type beaker with Glycerin (1400 cp) and olive oil (80 cp) at 100 RPM. All subsequent measurements are performed in 50 ml beakers at 100 RPM with the appropriate spindle.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It is intended to cover, in the appended claims, all such modifications that are within the scope of the invention.

What is claimed is:

1. A surface coating film for at least partially covering a surface, said coating film comprised of a plurality of non-photoactive nanoparticles which are present in an amount less than 3 µg/cm² of the area of the surface.
2. The film of claim 1 wherein at least some of said nanoparticles comprise a synthetic mineral.
3. The film of claim 1 wherein at least some of said nanoparticles comprise smectite.
4. The film of claim 1 wherein at least some of said nanoparticles comprise hectorite.
5. The film of claim 1 wherein at least some of said nanoparticles comprise fluorohectorite.
6. The film of claim 1 optionally containing a non-functional level of binder material.
7. The film of claim 1 containing less than 3% peptizer.
8. The film of claim 1 consisting essentially of nanoparticles, a wetting agent, and water.
9. The film of claim 1 which is substantially continuous.
10. The film of claim 1 which is transparent.
11. The film of claim 1 having an exposed first surface and a second surface adjacent the surface to which it is applied, wherein said first surface of said film is hydrophilic.
12. The film of claim 1 which is less than 300 nanometers thick.
13. A surface coating film for at least partially covering a surface, said coating film comprised of a plurality of non-photoactive nanoparticles and water, said film having a water content of less than or equal to about 4%.
14. The film of claim 13 which is less than 300 nanometers thick.

* * * * *